United States Patent
Nobuoka et al.

(10) Patent No.: US 9,747,512 B2
(45) Date of Patent: Aug. 29, 2017

(54) ARTICLE RECOGNITION APPARATUS AND IMAGE PROCESSING METHOD FOR ARTICLE RECOGNITION APPARATUS

(71) Applicant: TOSHIBA TEC KABUSHIKI KAISHA, Tokyo (JP)

(72) Inventors: Tetsuya Nobuoka, Sunto Shizuoka (JP); Masaaki Yasunaga, Sunto Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/750,833

(22) Filed: Jun. 25, 2015

(65) Prior Publication Data
US 2016/0379076 A1    Dec. 29, 2016

(51) Int. Cl.
G06K 9/00    (2006.01)
G06K 9/46    (2006.01)
G06K 9/62    (2006.01)
G06Q 20/20   (2012.01)
G06K 7/10    (2006.01)
G06T 7/11    (2017.01)

(52) U.S. Cl.
CPC .......... *G06K 9/46* (2013.01); *G06K 7/10722* (2013.01); *G06K 9/6215* (2013.01); *G06Q 20/208* (2013.01); *G06T 7/11* (2017.01); *G06K 2009/6213* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 7,353,994 B2 * | 4/2008 | Farrall | ..................... | G06K 7/12 235/454 |
| 9,033,229 B2 * | 5/2015 | Matsuhisa | .......... | G06K 7/10861 186/59 |
| 9,067,744 B2 * | 6/2015 | Takizawa | ............... | B65G 61/00 |
| 2008/0253608 A1* | 10/2008 | Long | ........................ | G06K 7/14 382/100 |
| 2010/0017407 A1* | 1/2010 | Beniyama | ......... | G06F 17/30259 707/E17.016 |
| 2011/0029922 A1* | 2/2011 | Hoffberg | ............ | G05B 19/0426 715/811 |
| 2013/0096713 A1* | 4/2013 | Takizawa | ............... | B65G 61/00 700/224 |
| 2014/0191037 A1* | 7/2014 | Matsuhisa | .......... | G06K 7/10861 235/455 |

FOREIGN PATENT DOCUMENTS

JP          2013101708 A     5/2013

\* cited by examiner

*Primary Examiner* — Tahmina Ansari
(74) *Attorney, Agent, or Firm* — Patterson & Sheridan, LLP

(57) ABSTRACT

According to one embodiment, an article recognition apparatus includes an image acquisition unit, a recognition unit, a region detection unit, a storage unit, and a determination unit. The recognition unit recognizes each of the articles. The region detection unit determines article region information. The storage unit stores article information including a reference value for the article region information. The determination unit determines that an unrecognized article exists, if the reference value for the article region information of each article which the recognition unit recognized does not match with the article region information.

10 Claims, 20 Drawing Sheets

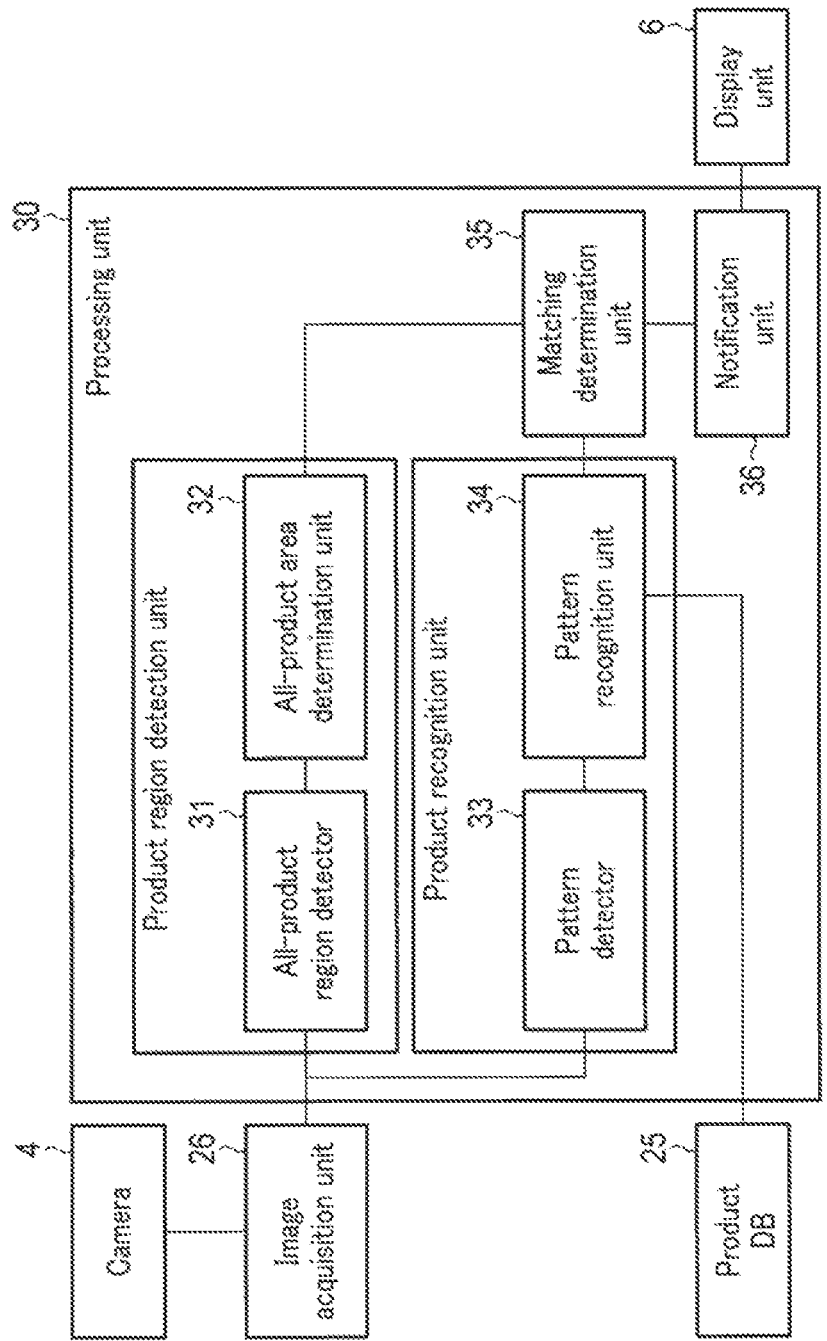
F I G. 3

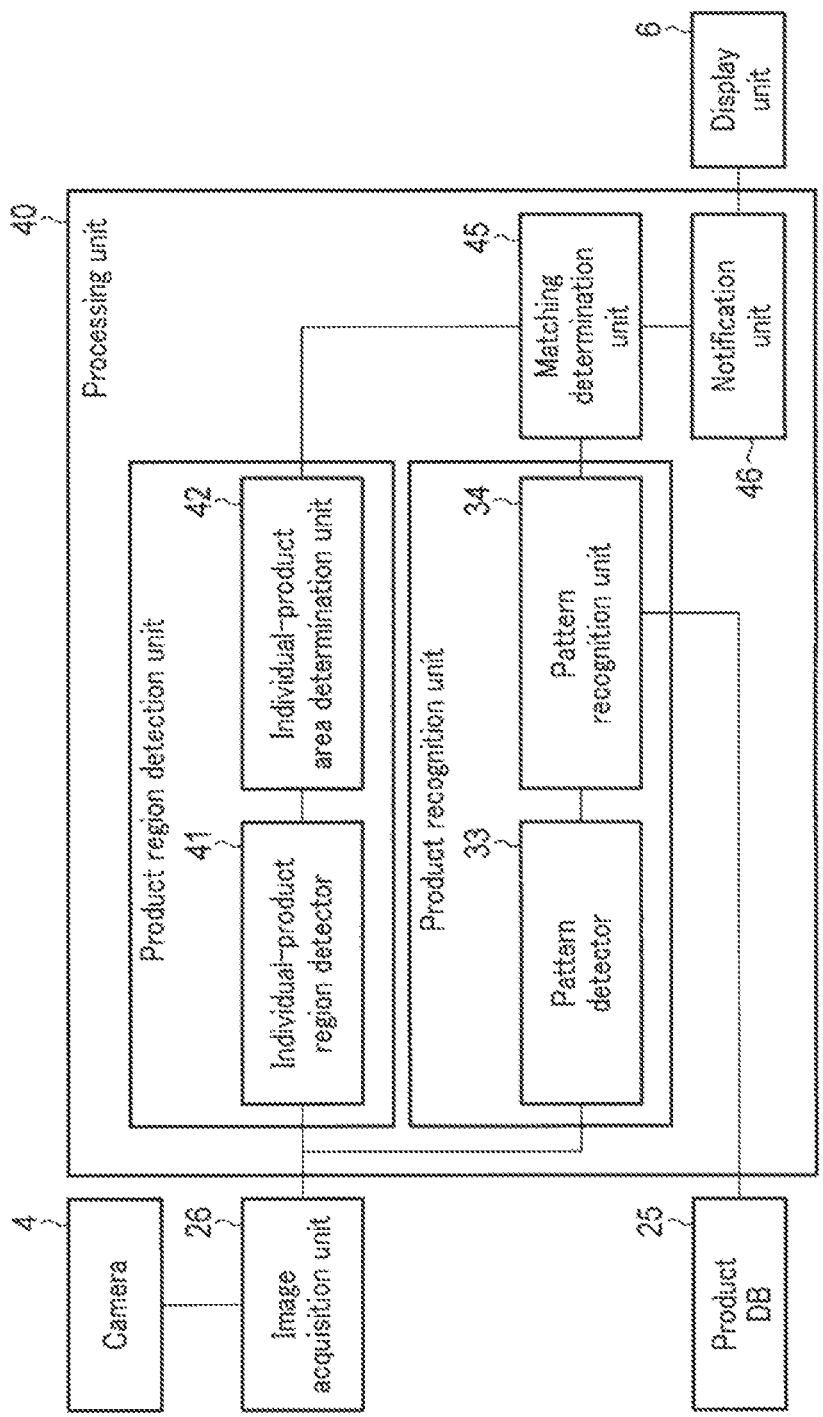
F I G. 6

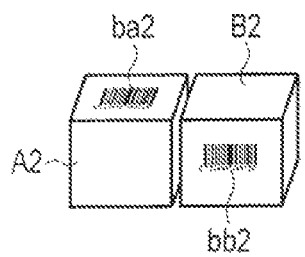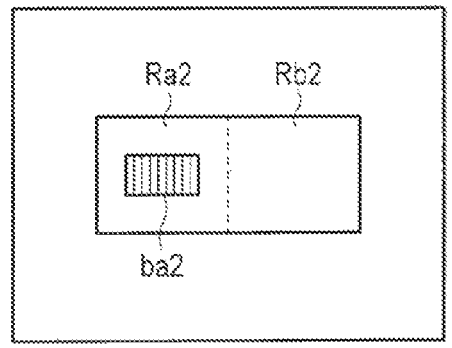
FIG. 7A  FIG. 7B
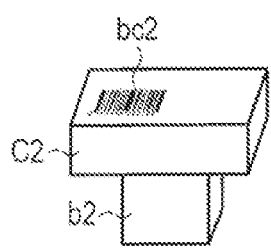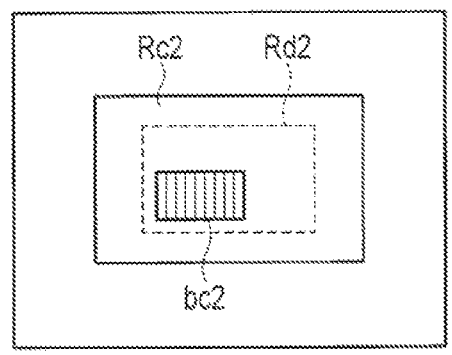
FIG. 8A  FIG. 8B
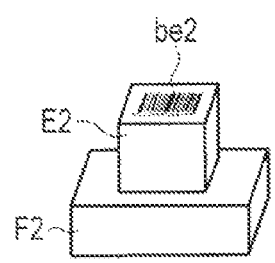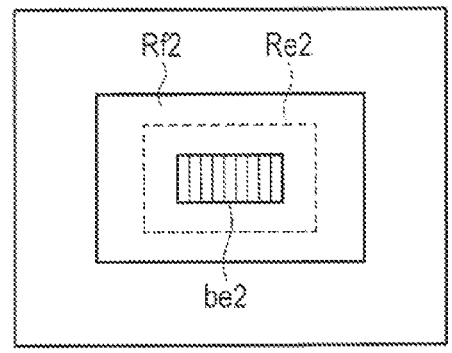
FIG. 9A  FIG. 9B

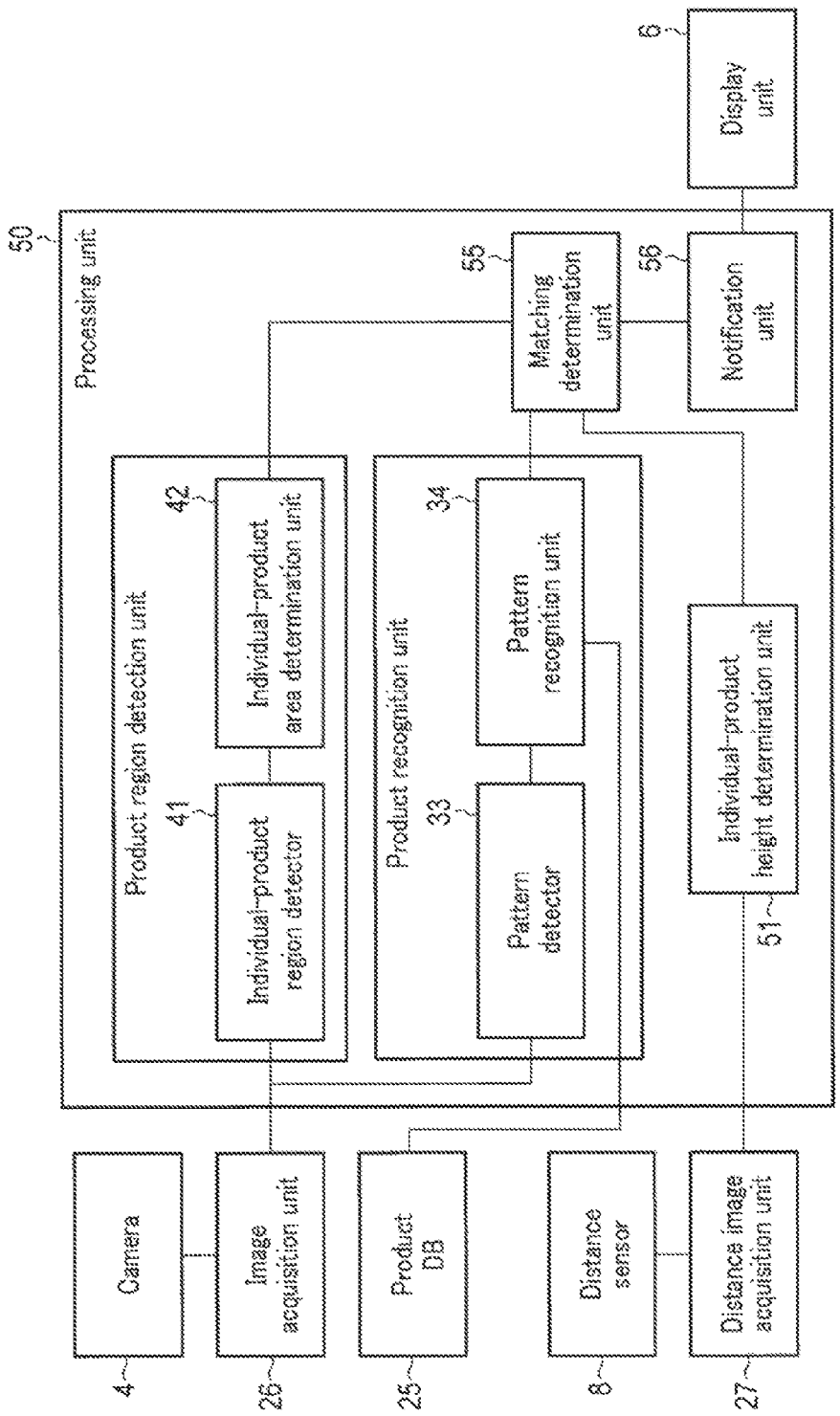
F I G. 13

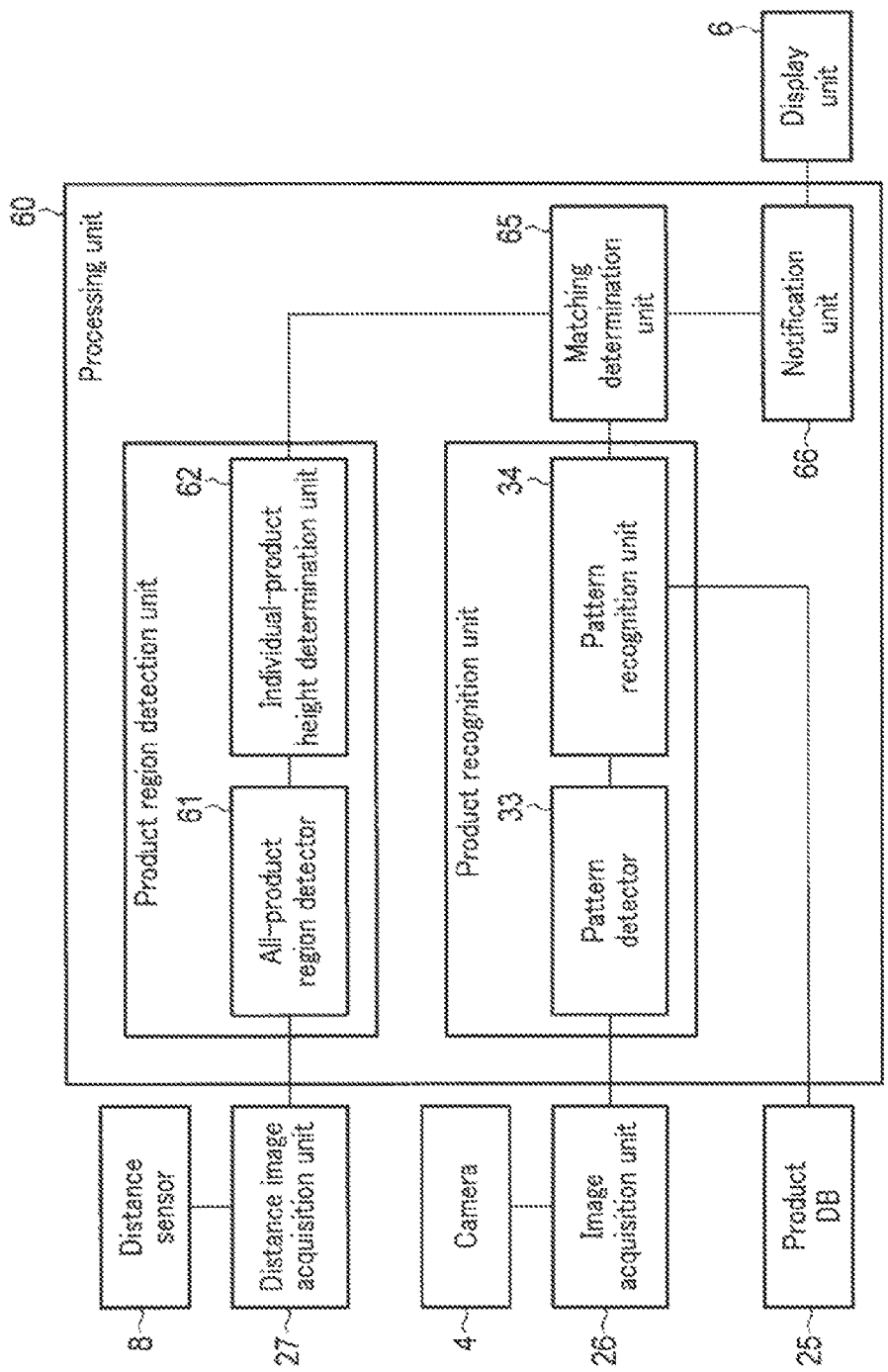
F I G. 16

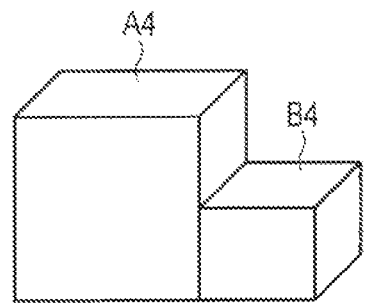
F I G. 17A
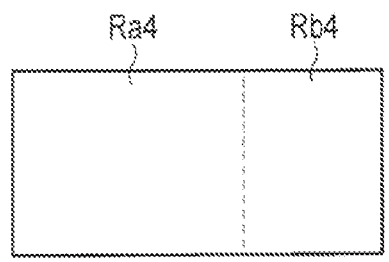
F I G. 17B
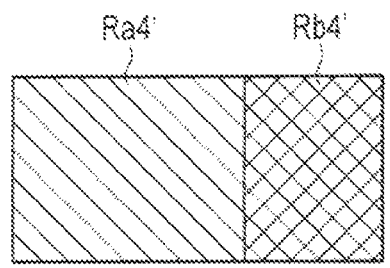
F I G. 17C

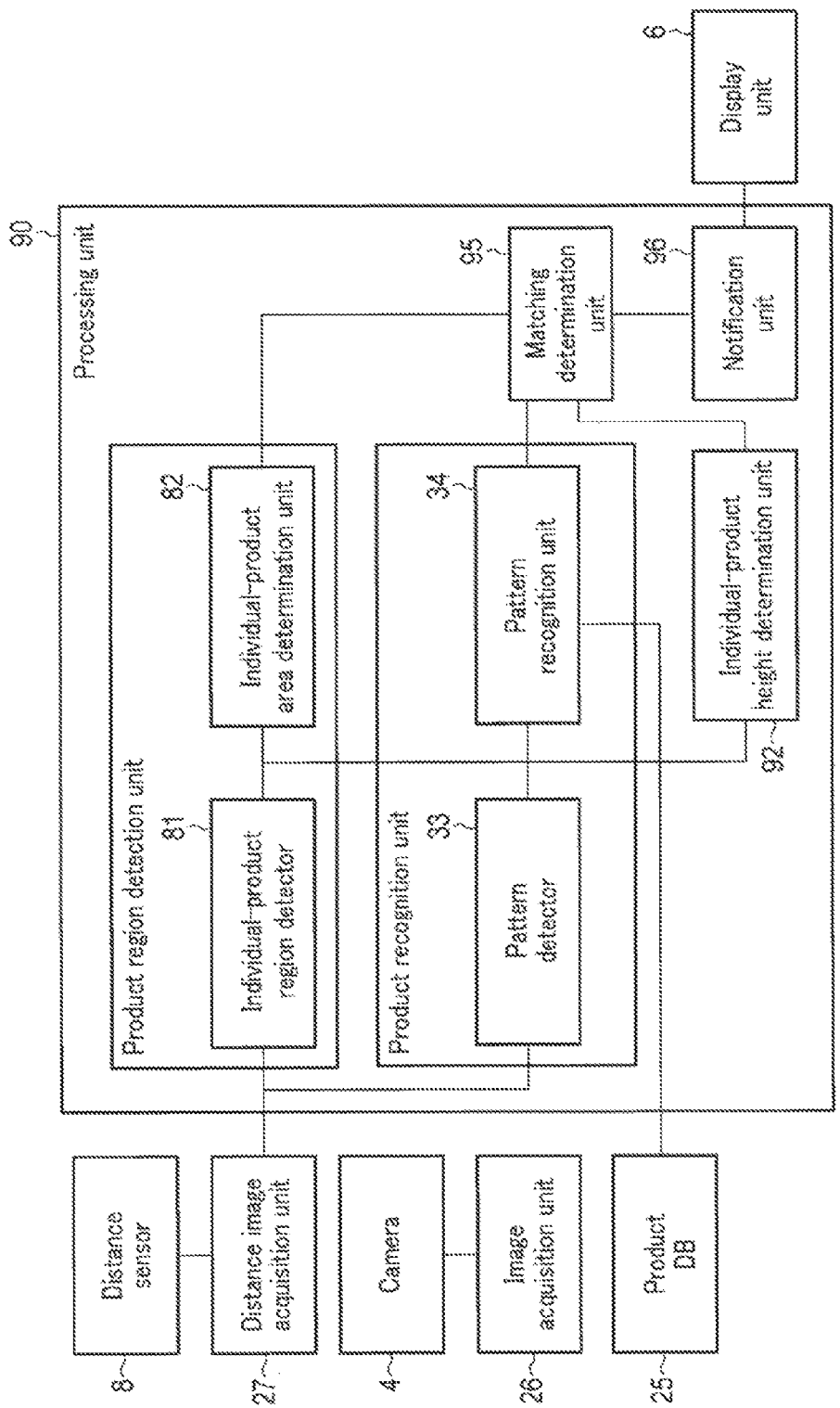
F I G. 23

ARTICLE RECOGNITION APPARATUS AND IMAGE PROCESSING METHOD FOR ARTICLE RECOGNITION APPARATUS

FIELD

Embodiments described herein relate generally to an article recognition apparatus and an image processing method.

BACKGROUND

A settlement apparatus recognizes all products, which are objects of settlement, in an image which a camera captured, and settles all recognized products. The settlement apparatus includes a function as an article recognition apparatus which recognizes products by identification patterns such as bar codes. The settlement apparatus cannot recognize a product which is not photographed in a state in which the identification pattern is recognizable. For example, the settlement apparatus, which recognizes products by bar codes, cannot recognize a product whose bar code is not directed to the camera. As a method of confirming whether all products that are objects of settlement were successfully recognized or not, there is a method of confirming whether an actually measured total weight of all products agrees with a total weight calculated from product information of all recognized products. However, since the above-described confirmation method requires a structure for actually measuring the weight of products, the cost of the settlement apparatus increases. In addition, this confirmation method is unable to detect which product fails to be recognized.

BRIEF DESCRIPTION OF THE DRAWINGS

FIG. 3 is a view illustrating a configuration example of a processing function in the settlement apparatus according to the first embodiment.

FIG. 6 is a view illustrating a configuration example of a processing function in a settlement apparatus according to a second embodiment.

FIG. 7A illustrates a first disposition example of two products which are objects of settlement by the settlement apparatus according to the second embodiment.

FIG. 7B illustrates an example of a photographed image captured by photographing the two products of the first disposition example shown in FIG. 7A.

FIG. 8A illustrates a second disposition example of two products which are objects of settlement by the settlement apparatus according to the second embodiment.

FIG. 8B illustrates an example of a photographed image captured by photographing the two products of the second disposition example shown in FIG. 8A.

FIG. 9A illustrates a third disposition example of two products which are objects of settlement by the settlement apparatus according to the second embodiment.

FIG. 9B illustrates an example of a photographed image captured by photographing the two products of the third disposition example shown in FIG. 9A.

FIG. 13 is a block diagram illustrating a configuration example of a processing function of the settlement apparatus according to the third embodiment.

FIG. 16 is a block diagram illustrating a configuration example of a processing function of a settlement apparatus according to a fourth embodiment.

FIG. 17A illustrates an example in which two products with different heights, which are objects of settlement by the settlement apparatus according to the fourth embodiment, are disposed to neighbor in contact with each other.

FIG. 17B illustrates a photographed image captured by photographing the two products in the disposition state shown in FIG. 17A.

FIG. 17C illustrates a distance image of the two products in the disposition state shown in FIG. 17A.

FIG. 23 is a block diagram illustrating a configuration example of a processing function of a settlement apparatus according to a seventh embodiment.

DETAILED DESCRIPTION

In general, according to one embodiment, an article recognition apparatus includes an image acquisition unit, a recognition unit, a region detection unit, a storage unit, and a determination unit. The image acquisition unit acquires a photographed image captured by photographing a photography range including a range in which all articles to be recognized are disposed. The recognition unit detects all of identification patterns for identifying the articles in the photographed image, and recognizes each of the articles by each of the detected identification patterns. The region detection unit detects image regions of the articles in the photographed image, and determines article region information from the detected image regions of the articles. The storage unit stores, with respect to each of the articles that are objects of recognition by the recognition unit, article information including a reference value for the article region information which the region detection unit determines from the image regions of the articles. The determination unit determines that an unrecognized article exists, if the reference value for the article region information of each article which the recognition unit recognized does not match with the article region information which the region detection unit determined from the image regions of the articles in the photographed image.

First to seventh embodiments will be described hereinafter with reference to the accompanying drawings.

First Embodiment

To begin with, a settlement apparatus (article recognition apparatus) 1A according to a first embodiment is described.

Figure 1:
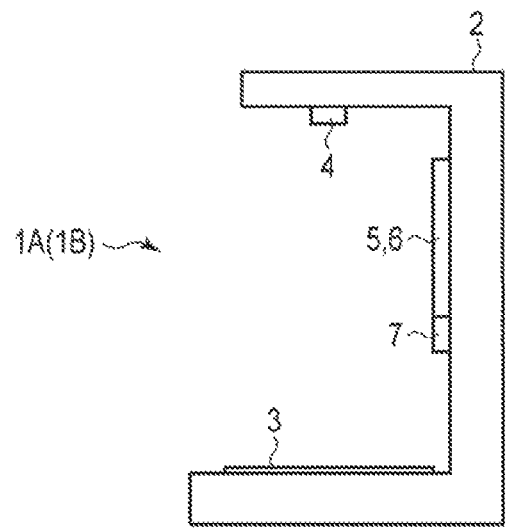
FIG. 1 is a view which schematically illustrates an external appearance structure of a settlement apparatus according to a first embodiment.

FIG. 1 is a view which schematically illustrates a configuration example of the external appearance of the settlement apparatus 1A according to the first embodiment.

The settlement apparatus 1A includes a function as an article recognition apparatus which recognizes products as articles, and a settlement function of settling the purchase prices of the products. The settlement apparatus 1A recognizes products that are objects of settlement, and settles the purchase prices of the recognized products. The settlement apparatus 1A is disposed, for example, in a store which sells goods. The settlement apparatus 1A may be installed as a self-checkout system which a user operates by himself/herself. In addition, the settlement apparatus 1A may be installed as an ordinary cash register which a salesclerk of the store operates. The settlement apparatus 1A executes a settlement process on products at a predetermined position. For example, the products, which are objects of settlement, may be placed on a product table 3, or may be placed on the product table 3 in the state in which the products are put in a basket or the like.

The settlement apparatus 1A recognizes products, based on an image (photographed image) captured by photographing a predetermined photography range from a predetermined direction. The settlement apparatus 1A executes a settlement process, based on a recognition result of all products. The product that is the object of settlement includes an identification pattern (identification information) for identifying the product. For example, the identification pattern is a bar code, a two-dimensional code, characters, numerals, or a mark. The identification pattern, such as the bar code, two-dimensional code, characters, numerals or mark, is added to at least one surface of the product. In addition, the settlement apparatus 1A may recognize the product by object recognition (recognition of a pattern of a product image in which the product is photographed). In the object recognition, the identification pattern is a pattern of a product image captured by photographing the product from a specific direction. Hereinafter, a description is given on the assumption that the settlement apparatus 1A recognizes the product by a bar code serving as an identification pattern that is added (e.g. printed or attached) to one surface of the product that is the object of settlement.

In the configuration example illustrated in FIG. 1, the settlement apparatus 1A includes a housing 2, a product table 3, a camera 4, a display unit 5, an operation unit 6, and a settlement unit 7.

The housing 2 forms an outer shape of the settlement apparatus 1A. The shape of the housing 2 is not limited to a specific shape, if the housing 2 has such a shape that the respective components can be disposed. In the example illustrated in FIG. 1, the housing 2 has such a shape that the camera 4 is disposed above the product table 3. In addition, the housing 2 accommodates a control unit of a processor, a storage unit, etc.

The camera 4 photographs, as a photography range, a region where products that are objects of settlement are disposed. In the configuration example illustrated in FIG. 1, the camera 4 acquires the image of a photography range including the entirety of the product table 3 on which products of settlement objects are placed. In addition, the camera 4 photographs the product table 3 from above. It should suffice if the camera 4 can photograph bar codes in a recognizable state, which are added to products on the product table 3 or to products in a basket on the product table 3. For example, the camera 4 is composed of a CCD camera or the like. In addition, the camera 4 may be a camera which photographs invisible light. The camera 4 may be a plurality of cameras. The structure of the camera 4 is not restricted to a specific structure.

The display unit 5 is a display device which displays various pieces of information. The display unit 5 is, for instance, a liquid crystal display device. The operation unit 6 is a user interface for an operator, who operates the settlement apparatus 1A, to input various operational instructions. The operation unit 6 transmits data of operational instructions, which the operator input, to the control unit. The operation unit 6 is, for instance, a keyboard, numeral keys, a touch panel, etc. In addition, the operation unit 6 may be configured to accept an input of a gesture from the user. Besides, the display unit 5 and operation unit 6 may be a display device including a touch panel.

The settlement unit 7 executes a settlement process of products. For example, the settlement unit 7 may be configured to settle the payment of the purchase price of products by a credit card, to settle the payment of the purchase price of products in cash, or to settle the payment of the purchase price of products by electronic money. In addition, the settlement unit 7 may include a function of executing not only the settlement process, but also a process relating to settlement. For example, the settlement unit 7 may execute a membership authentication process by membership cards, or may execute a process of giving points to a storage medium (e.g. a card) which the user possesses.

Incidentally, the display unit 5, operation unit 6 and settlement unit 7 may be disposed at arbitrary positions. For example, the display unit 5, operation unit 6 or settlement unit 7 may be formed integral with the housing 2. The settlement apparatus 1A may be configured such that any one of, or all of, the display unit 5, operation unit 6 and settlement unit 7 are omitted.

Additionally, the settlement apparatus 1A may include some other structure such as an illumination. Besides, the settlement apparatus 1A may include a detection unit which detects that a product (or a basket) was placed on the product table 3. When the settlement apparatus 1A detected that a product (or a basket) was placed on the product table 3, the settlement apparatus 1A may automatically start a settlement process (product recognition process).

Next, a configuration example of a control system of the settlement apparatus 1A is described.

Figure 2:
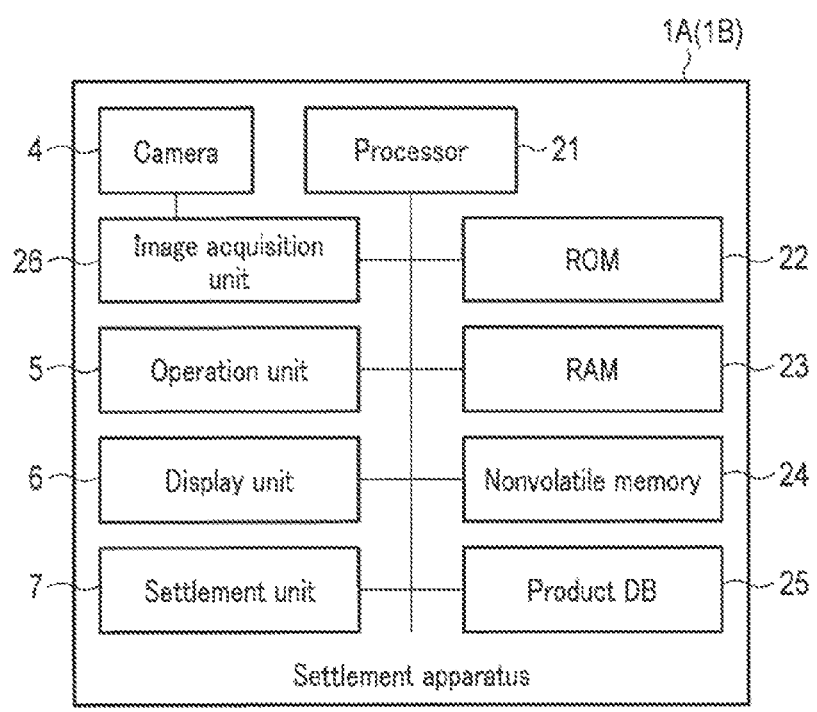
FIG. 2 is a block diagram illustrating a configuration example of a control system of the settlement apparatus according to the first embodiment.

FIG. 2 is a block diagram illustrating a configuration example of the control system of the settlement apparatus 1A.

As illustrated in FIG. 2, the settlement apparatus 1A includes the camera 4, display unit 5, operation unit 6, settlement unit 7, a processor 21, a ROM 22, a RAM 23, a nonvolatile memory 24, a product database (DB) 25, and an image acquisition unit 26.

The processor 21 is, for example, a CPU. The processor 21 executes overall control of the settlement apparatus 1A. The processor 21 realizes various processes, based on programs and control data stored in the ROM 22. For example, by executing programs stored in the storage unit 22, the processor 21 executes various processes corresponding to an operational control of the settlement apparatus 1A or an operational mode of the settlement apparatus 1A.

Incidentally, a part of various functions which the processor 21 realizes, as will be described later, may be realized by hardware.

The ROM 22 is a nonvolatile memory which prestores programs for control, and control data. The ROM 22 is assembled in the settlement apparatus 1A in the state in which the control programs and control data were stored at the stage of manufacture. Specifically, the control programs and control data, which are stored in the ROM 22, are assembled in advance in accordance with the specifications of the settlement apparatus 1A.

The RAM 23 is a volatile memory. The RAM 23 functions as a working memory. The RAM 23 temporarily stores, for example, data which the processor 21 is processing. The RAM 23 stores application programs, based on instructions from the processor 21. In addition, the RAM 23 may store, for example, data which are necessary for executing application programs, and execution results of the application programs.

The nonvolatile memory 24 is composed of a nonvolatile memory which is capable of data write and data rewrite. For example, the nonvolatile memory 24 is composed of an HDD (hard disk drive), an SSD (solid-state drive), an EEPROM, or a flash ROM. The nonvolatile memory 24 stores control programs, applications and various data, which correspond to operational purposes of the settlement apparatus 1A.

In addition, the product database (DB) 25 stores information (product information) relating to products which are objects of recognition. The product DB 25 may be provided in the nonvolatile memory 24. In addition, the product DB 25 may be provided in a server which is communicable via a communication interface. The product DB 25 stores, as product information of each product, a product code, a product name, a price, a reference area, etc. The product code is identification information for uniquely identifying the product. The price is information indicative of a purchase price that is necessary for settlement of the product.

The reference area is a reference value for article region information. The reference area is a reference value for article region information when the article region information, which is determined from an image region of an article in a photographed image, is an area. The reference area is an area of an image region of a product in an image which the camera 4 captured in a state in which the product is correctly set on the product table 3 (i.e. the product is set without an overlap, with the bar code area facing upward). Incidentally, the product information may include a reference height (a reference value for article region information) as a height of a product in a state in which the product is correctly set on the product table 3 (i.e. the product is set without an overlap, with the bar code area facing upward).

The image acquisition unit 26 is an interface for connection to the camera 4. The image acquisition unit 26 acquires an image which the camera 4 captured. For example, the processor 21 instructs the camera 4 to capture an image, via the image acquisition unit 26 functioning as a camera interface, and acquires the image which the camera 4 captured.

Next, a processing function of the settlement apparatus 1A is described.

FIG. 3 is a block diagram illustrating a configuration example of the processing function of the settlement apparatus 1A.

A processing unit 30 shown in FIG. 3 illustrates a processing function which the processor 21 of the settlement apparatus 1A realizes by executing programs stored in the nonvolatile memory 24 or ROM 22. The processing unit 30 includes an all-product region detector 31, an all-product area determination unit 32, a pattern detector 33, a pattern recognition unit 34, a matching determination unit 35, and a notification unit 36. The components 31 to 36 in the processing unit 30 are realized by the processor 21 executing programs. However, a part or all of the components 31 to 36 in the processing unit 30 may be realized by hardware such as different processors.

The all-product region detector 31 and all-product area determination unit 32 function as a product region detection unit which the processor 21 executes. The all-product region detector 31 detects image regions of all products in the photographed image of the camera 4, which the image acquisition unit 26 acquires. The all-product region detector 31 detects image regions of all products, based on a difference between a background image (an image in which no product is placed) and an input image (an image in which products are placed). The method of detecting the image regions of all products, which is applied to the all-product region detector 31, is not limited to a specific method.

The all-product area determination unit 32 determines the area of the image regions of all products, which the all-product region detector 31 detected. For example, the all-product area determination unit 32 calculates the total number of pixels of all detected product image regions as the area of the all product regions. The method of determining the area of the all product image regions, which is applied to the all-product area determination unit 32, is not limited to a specific method.

The pattern detector 33 and pattern recognition unit 34 function as a product recognition unit (recognition unit) which the processor 21 executes. The pattern detector 33 detects all bar codes (identification patterns) included in the photographed image of the camera 4, which was acquired by the image acquisition unit 26. The pattern detector 33 may detect bar codes, for example, by specifying a region with a strong high-frequency component. The method of detecting bar codes, which is applied to the pattern detector 33, is not limited to a specific method.

The pattern recognition unit 34 recognizes each product by each bar code (identification pattern) which was detected by the pattern detector 33. For example, the pattern recognition unit 34 identifies (recognizes) the product by collating information, which is obtained by decoding the detected bar code, and the product information which the product DB 25 stores. Incidentally, the pattern recognition unit 34 may adopt a method of identifying (recognizing) the product by using an image characteristic amount (identification pattern) such as a density gradient or a color histogram.

The matching determination unit 35 determines whether the state of the image region of the product in the photographed image matches with the recognition result of the product. The matching determination unit 35 determines whether the image of the product in the photographed image matches with the recognition result. The matching determination unit 35 determines whether the area of the all product regions detected from the photographed image is substantially substantially equal to the total value of the areas of all recognized products, which are registered in the product DB 25 (i.e. the total area of all recognized products). For example, the matching determination unit 35 determines whether the area of all product image regions detected from the photographed image is substantially equal to the total area of all recognized products, by determining whether the difference between the area of all product image regions detected from the photographed image and the total area of all recognized products is within a predetermined range.

The notification unit 36 outputs a determination result by the matching determination unit 35. If the matching determination unit 35 determined that the area of all product image regions and the total area of all recognized products are substantially equal, the notification unit 36 outputs a notification that there is no unrecognized product. In addition, if the matching determination unit 35 determined that the area of all product image regions and the total area of all recognized products are not substantially equal, the notification unit 36 outputs a notification that there is an unrecognized product. For example, if the matching determination unit 35 determined that the area of all product image regions and the total area of all recognized products are not substantially equal, the notification unit 36 causes the display unit 6 to display, as an alert, a notification that there is an unrecognized product.

Next, the relationship between the photographed image by the camera 4 and the product recognition process is described.

The camera 4 photographs a photography range including the entirety of the product table 3 from above the product table 3. The processor 21 extracts a bar code (identification pattern) of each product from the photographed image which the camera 4 captured, and recognizes each product by the extracted bar code. The settlement apparatus 1A presupposes that all products which are objects of settlement are placed on the product table 3, with the bar codes of all products facing upward (facing the camera 4).

When all products are set in the correct direction (when the bar codes of all products are set toward the camera), the camera 4 can capture an image including the images of bar codes of all products. If the processor 21 acquires from the camera 4 the photographed image including the images of bar codes of all products, the processor 21 can recognize all products from this photographed image. If the processor 21 successfully recognizes all products, the processor 21 can correctly execute a settlement process on all products.

If the bar codes of a part of products are not set toward the camera, the camera 4 cannot photograph the bar codes of the part of products. If the camera fails to photograph the bar codes of the part of products, the processor 21 is unable to recognize the products whose bar codes were not photographed, and thus the processor 21 cannot correctly execute the settlement process on all products.

Figure 4A:
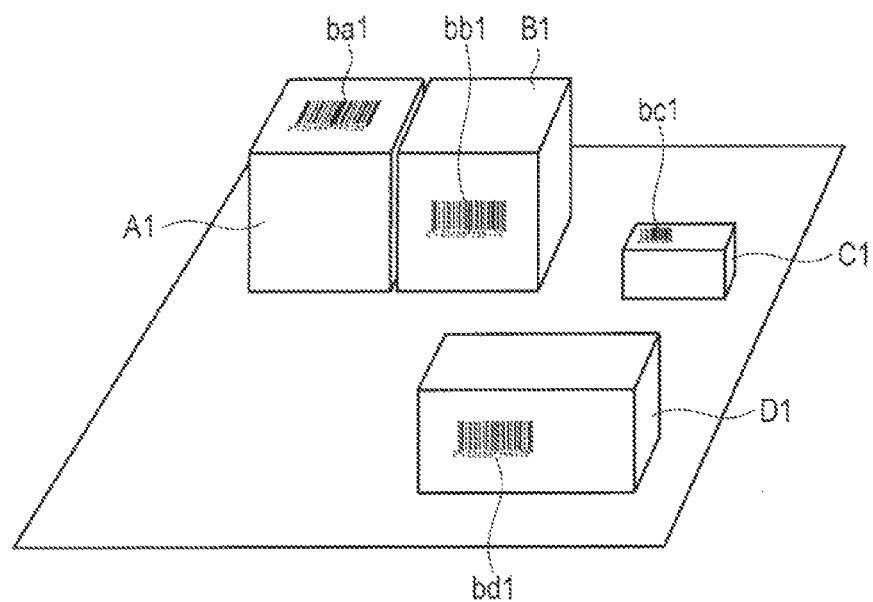
FIG. 4A illustrates an example of disposition of a plurality of products which are objects of settlement by the settlement apparatus according to the first embodiment.

FIG. 4A is a view illustrating an example of disposition of a plurality of products on the product table 3.

FIG. 4A illustrates a state in which four products (A1, B1, C1, D1) are placed on the product table 3. The products A1, B1, C1 and D1 include surfaces on which bar codes b (ba1, bb1, bc1, bd1) are added, respectively. The bar codes ba1, bb1, bc1, and bd1 are identification patterns for identifying the products A1, B1, C1 and D1 (i.e. information for recognizing the products). In the state illustrated in FIG. 4A, those surfaces of the product A1 and product C1, on which the bar codes ba1 and bc1 are added, face the camera 4 (face upward). Those surfaces of the product B1 and product D1, on which the bar codes bb1 and bd1 are added, do not face the camera 4.

Figure 4B:
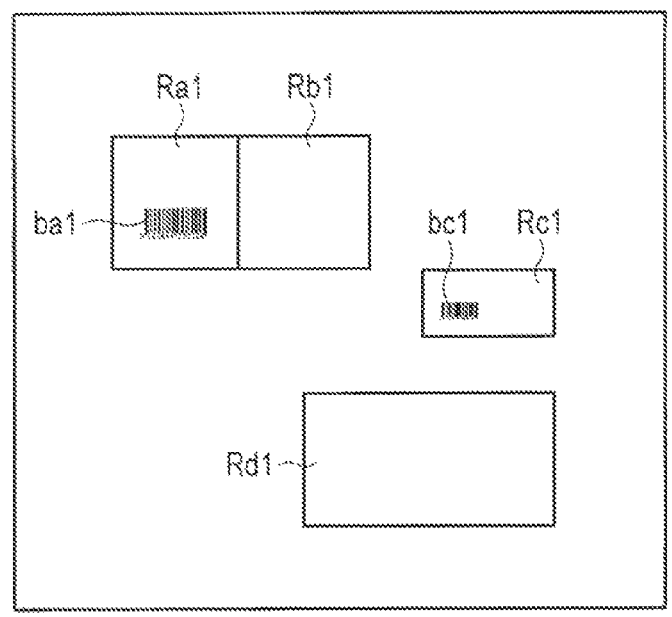
FIG. 4B illustrates an example of a photographed image captured by photographing the plural products shown in FIG. 4A.

FIG. 4B illustrates an image (photographed image) which the camera 4 captured in the state of disposition illustrated in FIG. 4A.

The photographed image shown in FIG. 4B includes images Ra1, Rb1, Rc1 and Rd1 of the products A1, B1, C1 and D1. The image Ra1 of the product A1 in the photographed image shown in FIG. 4B includes an image of the bar code ba1 which identifies the product A1. The image Rb1 of the product B1 does not include an image of the bar code bb1 which is added to the product B1. The image Rc1 of the product C1 includes an image of the bar code bc1 which identifies the product C1. The image Rd1 of the product D1 does not include an image of the bar code bd1 which is added to the product D1.

The processor 21 can extract the bar code ba1 in the image Ra1 from the photographed image shown in FIG. 4B, and can recognize the product A1 by the extracted bar code ba1. In addition, the processor 21 can extract the bar code bc1 in the image Rc1 from the photographed image, and can recognize the product C1 by the extracted bar code bc1. No bar code image exists in the image Rb1 of the product B1 or the image Rd1 of the product D1 in the photographed image shown in FIG. 4B. Thus, the processor 21 can recognize neither the product B1 nor product D1 from the photographed image shown in FIG. 4B.

On the other hand, the processor 21 can extract the images Ra1, Rb1, Rc1 and Rd1 of the respective products in the photographed image shown in FIG. 4B as image regions of all products. For example, the processor 21 extracts all product image regions (images Ra1, Rb1, Rc1 and Rd1), based on a difference from the background image (e.g. an image of the product table 3). In the photographed image shown in FIG. 4B, since the product A1 and product B1 are placed in contact with each other, the processor 21 extracts the image Ra1 of the product A1 and the image Rb1 of the product B1 as one image region. In addition, the processor 21 extracts an image region of the image Rc1 of the product C1 and an image region of the image Rd1 of the product D1, respectively. By totaling the sizes of these image regions, the processor 21 calculates the size of the image regions of all products.

The processor 21 extracts the image regions of the respective products, regardless of the presence/absence of bar codes. Thus, the size of all product image regions in the photographed image (i.e. the total area of the image regions of all products) include image regions of products whose bar codes are not photographed. On the other hand, the processor 21 can calculate a total value of the areas of all recognized products (i.e. the total area of all recognized products) from the product information stored in the product DB 25. The product DB 25 stores a reference area of each product (the area of an image in a case of photographing the surface to which the bar code is added). By totaling the reference areas of all recognized products, the processor 21 calculates the total area of all recognized products.

Specifically, the total area of image regions of all products in the photographed image is greater than the total area of the reference areas of all recognized products (the total area of all recognized products) by an amount corresponding to the areas of image regions of unrecognized products. Accordingly, by determining whether the total area of all photographed products is substantially equal to the total area of all recognized products, the processor 21 can determine whether there is an unrecognized product or not.

Next, a first settlement process in the settlement apparatus 1A according to the first embodiment is described.

Figure 5:
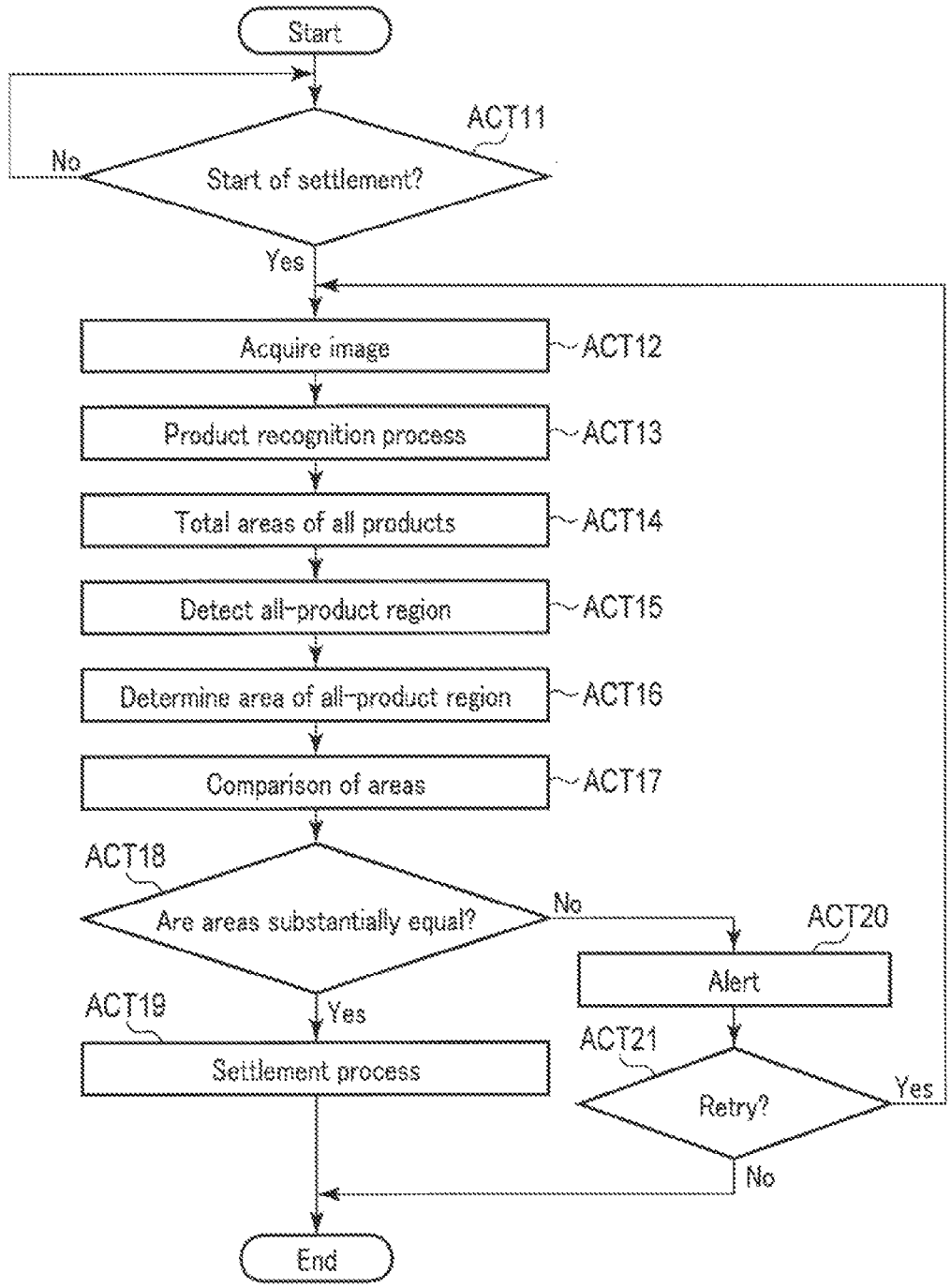
FIG. 5 is a flowchart for describing the flow of a first settlement process by the settlement apparatus according to the first embodiment.

FIG. 5 is a flowchart for describing an example of the first settlement process in the settlement apparatus 1A according to the first embodiment.

In a standby state, the processor 21 accepts a start instruction of the settlement process (ACT 11). For example, the processor 21 starts the settlement process in accordance with an instruction of a start button. The start button is a button for instructing the start of the settlement process on the products that are set on the product table 3. The start button may be an icon which the display unit 6 displays, or a hard key provided as the operation unit 5. In addition, the processor 21 may start the settlement process, responding to detection by a sensor of the setting of products or a basket on the product table 3.

Upon starting the settlement process in accordance with the start instruction (ACT 11, YES), the processor 21 instructs the camera 4 to photograph. The camera 4 photographs a photography range including the product table 3 in accordance with the instruction of the processor 21. The processor 21 acquires, by the image acquisition unit 26, a photographed image which the camera 4 captured (ACT 12). The processor 21 stores the photographed image, which the processor 21 acquires from the camera 4, in a memory such as the RAM 23.

After acquiring the photographed image, the processor 21 executes a product recognition process of recognizing products, and a region determination process of determining image regions of all products. The product recognition process is a process of recognizing all products in the photographed image by identification patterns (bar codes). The all-product region determination process is a process of calculating the area (size) of image regions of all products in the photographed image. The processor 21 may execute the product recognition process and the region determination process in parallel, or may execute these processes in order.

The processor 21 executes, as the product recognition process, a product recognition process on the photographed image (ACT 13). The processor 21 detects all bar codes (identification patterns) included in the photographed image of the camera 4 which was acquired by the image acquisition unit 26. Upon detecting the bar codes, the processor 21 recognizes the respective products by the detected bar codes. For example, the processor 21 identifies (recognizes) the products by collating the information (e.g. product codes) obtained by decoding the bar codes, and the information relating to the products, which is registered in the product DB 25.

In the meantime, the product recognition process may be realized by a method of identifying products by using an image characteristic amount (identification pattern) such as a density gradient or a color histogram. In this case, the product database 25 registers a density gradient or a color histogram on the to-be photographed surfaces of products as the image characteristic amount of the products.

When products in the photographed image were successfully recognized by the product recognition process, the processor 21 acquires, from the product DB 25, areas (reference areas) of surfaces (bar code surfaces) to which bar codes of the recognized products are added. If the product recognition process completes, the processor 21 calculates the total area of all recognized products by totaling the reference areas of the recognized products, which are acquired from the product DB 25 (ACT 14). For example, the processor 21 stores the calculated total area of all products in the RAM 23.

In addition, in the all-product region determination process, the processor 21 detects the image regions of all products in the photographed image (ACT 15). If the image regions of all products are detected from the photographed image, the processor 21 determines the total area of the image regions of all products (the area of all product regions in the photographed image) (ACT 16). For example, the processor 21 may calculate the total number of pixels of all detected product image regions as the area of all product regions.

The processor 21 compares the area of all product regions in the photographed image and the total area of the reference areas of all recognized products (the total area of all recognized products) (ACT 17). By this comparison, the processor 21 determines whether the area of all product regions in the photographed image and the total area of all recognized products are substantially equal or not (ACT 18). For example, the processor 21 determines whether the area of all product regions in the photographed image and the total area of all recognized products are substantially equal or not, by determining whether the difference between the area of all product regions in the photographed image and the total area of all recognized products is within a predetermined range.

If the processor 21 determines that the area of all product regions in the photographed image and the total area of all recognized products are substantially equal (ACT 18, YES), the processor 21 determines that there is no unrecognized product. If the processor 21 determines that there is no unrecognized product, the processor 21 executes the settlement process on all recognized products (ACT 19). For example, the processor 21 calculates the total amount of purchase prices of all recognized products, by referring to the product DB 25. Upon calculating the total amount of purchase prices of all recognized products, the processor 21 executes a settlement process of the total amount calculated by the settlement unit 7.

In addition, if the processor 21 determines that the area of all product regions in the photographed image and the total area of all recognized products are not substantially equal (ACT 18, NO), the processor 21 determines that there is an unrecognized product. If the processor 21 determines that there is an unrecognized product, the processor 21 generates an alert notifying the operator of the occurrence of an error (ACT 20). For example, the processor 21 displays, as an alert, a notification indicating that an unrecognized product is present or settlement is impossible, on the display unit 6. In addition, the processor 21 may produce, as an alert, an alarm by a speaker or the like provided on the settlement apparatus 1A.

After generating an alert, the processor 21 accepts an instruction of retry of the settlement process (product recognition process) (ACT 21). For example, the processor 21 retries the settlement process in accordance with an instruction on a retry button. The retry button may be an icon which the display unit 6 displays, or a hard key provided on the operation unit 5. If retry was instructed (ACT 21, YES), the processor 21 returns to ACT 12 and executes the above process once again. If retry is not instructed (ACT 21, NO), the processor 21 stops the settlement process and transitions to a standby state.

As described above, the settlement apparatus 1A according to the first embodiment determines whether the area of the image regions of all products in the photographed image and the total area of the reference areas of recognized products, which are registered in the product DB, are substantially equal or not. If the total area of the image regions of all products in the photographed image and the total area of the recognized products are not substantially equal, the settlement apparatus 1A determines that there is an unrecognized product. Specifically, the settlement apparatus 1A can detect an unrecognized product, based on the total area of the image regions of all products, which are detected from the photographed image. As a result, with a simple configuration, the settlement apparatus 1A can prevent a settlement process from being executed with prices which are lower than actual prices.

Second Embodiment

A settlement apparatus (article recognition apparatus) 1B according to a second embodiment can be realized by the same hardware configuration as in the settlement apparatus 1A illustrated in FIG. 1 and FIG. 2. However, a second settlement process, which the processor 21 of the settlement apparatus 1B according to the second embodiment executes, is different from the first settlement process of the first embodiment.

FIG. 6 is a block diagram illustrating a configuration example of a processing function in the settlement apparatus 1B.

A processing unit 40 shown in FIG. 6 illustrates a processing function which the processor 21 of the settlement apparatus 1B realizes by executing programs stored in the nonvolatile memory 24 or ROM 22. The processing unit 40 includes an individual-product region detector 41, an individual-product area determination unit 42, a pattern detector 33, a pattern recognition unit 34, a matching determination unit 45, and a notification unit 46. The components 41, 42, 33, 34, 45 and 46 in the processing unit 40 are realized by the processor 21 executing programs. However, a part or all of the components in the processing unit 40 may be realized by hardware such as different processors. Incidentally, since the pattern detector 33 and pattern recognition unit 34 can be realized by the same as in FIG. 3, a detailed description thereof is omitted.

The individual-product region detector 41 and individual-product area determination unit 42 function as a product region detection unit which the processor 21 executes. The individual-product region detector 41 detects an image region of an individual product in the photographed image of the camera 4 which the image acquisition unit 26 acquires. The individual-product region detector 41 detects, for example, an individual product region by a labeling process (a process of allocating numbers to respective independent regions) after obtaining a difference between a background image (an image in which no product is placed) and an input image (an image in which products are placed). The method of detecting image regions on a product-by-product basis, which is applied to the individual-product region detector 41, is not limited to a specific method.

The individual-product area determination unit 42 determines the area of the image region of an individual product (the area of each product image), which the individual-product region detector 41 detected. For example, the individual-product area determination unit 42 calculates the number of pixels in the image region of each detected product as the area of each product region. The method of determining the area of each product region, which is applied to the individual-product area determination unit 42, is not limited to a specific method.

The matching determination unit 45 determines whether the state of the image region of the product in the photographed image matches with the recognition result of the product. The matching determination unit 45 determines whether the area of each product region detected from the photographed image is substantially equal to the area of each recognized product. The matching determination unit 45 determines whether the area of each product region detected from the photographed image is substantially equal to the area of each recognized product, which is registered in the product DB 25. For example, the matching determination unit 45 determines whether the area of each product region is substantially equal to the area of each recognized product, by determining whether the difference between the area of each product region and the area of each recognized product is within a predetermined range.

The notification unit 46 outputs a determination result by the matching determination unit 45. If the matching determination unit 45 determined that the area of each product region and the area of each recognized product are substantially equal, the notification unit 46 outputs a notification that there is no unrecognized product. In addition, if the matching determination unit 45 determined that the area of each product region and the area of each recognized product are not substantially equal, the notification unit 46 outputs a notification that there is an unrecognized product. For example, if the matching determination unit 45 determined that the area of the image region of the product in the photographed image is not substantially equal to the area of the recognized product, the notification unit 46 causes the display unit 6 to display, as an alert, a notification that an unrecognized product exists in the image region.

Next, a description is given of dispositions of a plurality of products, and photographed images of a plurality of products.

FIG. 7A illustrates a disposition example of two products, namely a product A2 and a product B2. FIG. 7B illustrates an example of a photographed image captured by photographing the two products A2 and B2 shown in FIG. 7A.

In the disposition example shown in FIG. 7A, the product A2 and product B2 are disposed to neighbor each other. It is thus possible that a region Ra2 of the product A2 and a region Rb2 of the product B2 are extracted as a region of one product. Further, since only one bar code ba2 of the product A2 exists in the region Ra2 and region Rb2, the combined region of the region Ra2 and region Rb2 is calculated as the area of the product A2. The area of the region Ra2 and region Rb2 combined is greater than the area of the product A2 which is registered in the product DB 25. The settlement apparatus 1B can determine un unrecognized product due to the disposition as illustrated in FIG. 7A, by a comparison between the area of the product in the photographed image and the reference area of the recognized product, which is registered in the product DB 25. Further, the settlement apparatus 1B can determine that the unrecognized product exists in the region Ra2 and region Rb2 in the photographed image of FIG. 7B.

In addition, FIG. 8A illustrates a disposition example of two products, namely a product C2 and a product D2. FIG.

8B illustrates an example of a photographed image captured by photographing the two products C2 and D2 shown in FIG. 8A.

In the disposition example shown in FIG. 8A, the product C2 is disposed on the product D2. Thus, in the photographed image shown in FIG. 8B, a region Rd2 of the product D2 hides behind a region Rc2 of the product C2. The distance from the photographed surface of the product C2 to the camera 4 becomes shorter by such an amount that the product C2 is placed on the product D2 (i.e. by an amount corresponding to the height of the product D2). As a result, the area of the region Rc2 of the product C2 in the photographed image of FIG. 8B is greater than the area of the product C2 in a photographed image which is captured when only the product C2 is placed at a predetermined position. In addition, the product DB 25 stores the area of the product C2 in a photographed image which is captured when only the product C2 is placed at a predetermined position.

Specifically, the area of the region Rc2 of the product C2 in the photographed image of FIG. 8B is greater than the reference area of the product C2, which is registered in the product DB 25. The settlement apparatus 1B can determine an unrecognized product due to an overlap of products as illustrated in FIG. 8A, by comparing the area of the product in the photographed image and the reference area of the recognized product, which is registered in the product DB 25. Furthermore, the settlement apparatus 1B can determine that an unrecognized product exists within the region Rc2 in the photographed image of FIG. 8B.

Additionally, FIG. 9A illustrates a disposition example of two products, namely a product E2 and a product F2. FIG. 9B illustrates an example of a photographed image captured by photographing the two products E2 and F2 shown in FIG. 9A.

In the disposition example shown in FIG. 9A, the product E2 is placed on the product F2. Thus, in the photographed image shown in FIG. 9B, a region Re2 of the product E2 exists within a region Rf2 of the product F2. Hence, from the photographed image shown in FIG. 9B, the region Re2 of the product E2 cannot be detected, and there is a possibility that the region Rf2 of the product F2 is extracted as a region of one product. Furthermore, since only a bar code be2 of the product E2 exists in the region Rf2 (the region Re2 in the region Rf2), the area of the region Rf2 is calculated as the area of the product E2. The area of the region Rf2 is greater than the area of the product E2, which is registered in the product DB 25. The settlement apparatus 1B can determine an unrecognized product due to an overlap of products as illustrated in FIG. 9A, by comparing the area of the product in the photographed image and the area of the recognized product, which is registered in the product DB 25. Furthermore, the settlement apparatus 1B can determine that an unrecognized product exists within the region Rf2 in the photographed image of FIG. 9B.

In the meantime, if the distance of photography from the camera 4 to the to-be-photographed surface of the product varies, the size of the region of the bar coded added to the product, as well as the image of the whole product, varies. Accordingly, the settlement apparatus 1B may determine an unrecognized product, based on the size of the bar code region. In this case, the product database 25 stores the size of the bar code region on a product-by-product basis. The settlement apparatus 1B may determine the presence of an unrecognized product, if the area of the bar code region in the photographed image is greater than the area of the bar code region of the recognized product.

Next, a second settlement process in the settlement apparatus 1B according to the second embodiment is described.

Figure 10:
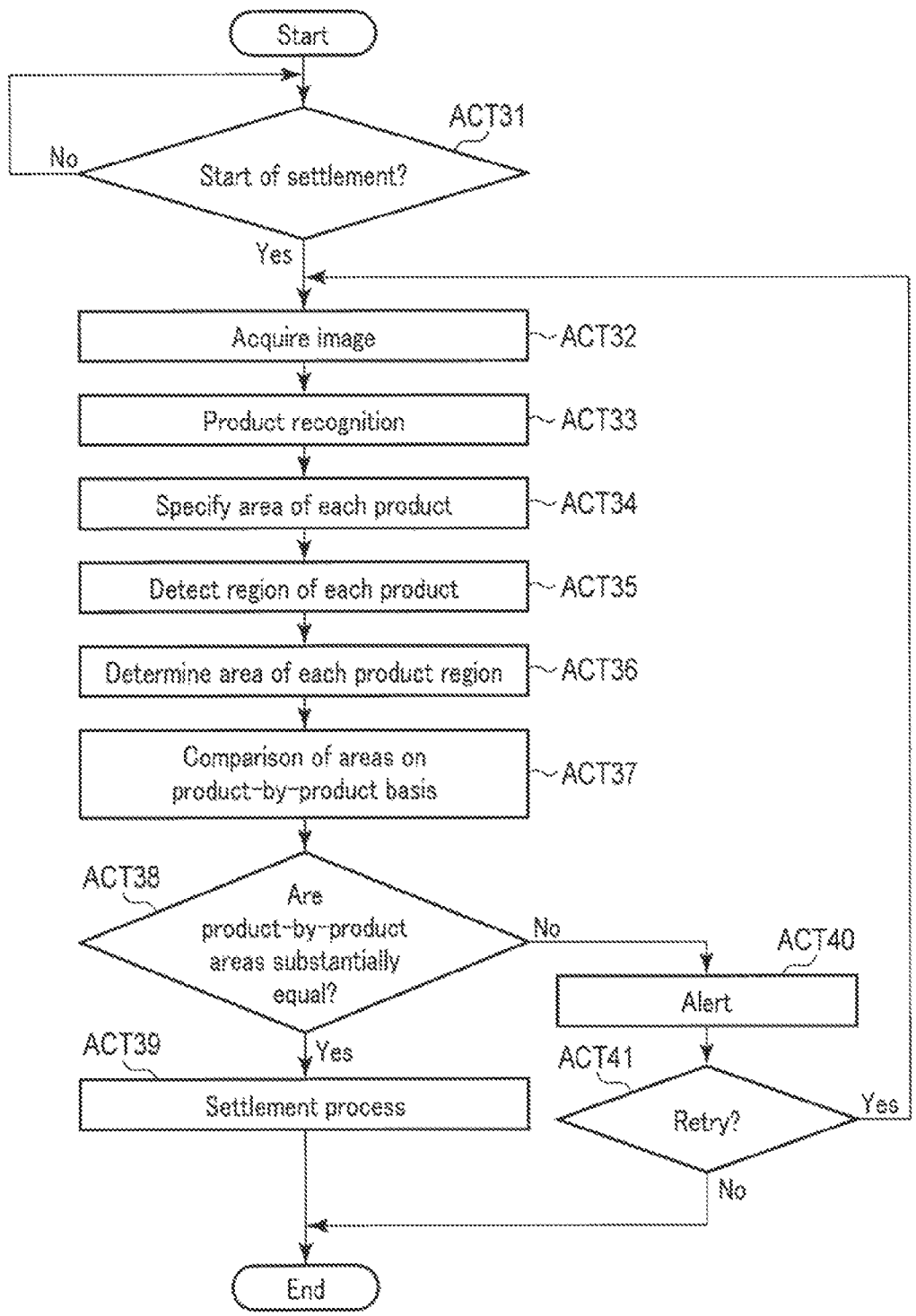
FIG. 10 is a flowchart for describing the flow of a second settlement process in the settlement apparatus according to the second embodiment.

FIG. 10 is a flowchart for describing an example of the second settlement process in the settlement apparatus 1B according to the second embodiment.

In a standby state, the processor 21 accepts a start instruction of the settlement process (ACT 31). Upon starting the settlement process in accordance to the start instruction of the settlement process (ACT 31, YES), the processor 21 instructs the camera 4 to photograph. The camera 4 photographs a photography range including the product table 3 in accordance with the instruction of the processor 21. The processor 21 acquires, by the image acquisition unit 26, a photographed image which the camera 4 captured (ACT 32). The processor 21 stores the photographed image, which the processor 21 acquires from the camera 4, in a memory such as the RAM 23.

After acquiring the photographed image, the processor 21 executes a product recognition process, and a product-by-product region determination process. The product recognition process is a process of recognizing each product by a bar code which is extracted from a product-by-product image region. The product-by-product region determination process is a process of detecting image regions of individual products. The processor 21 may execute the product recognition process and the product-by-product region determination process in parallel, or may execute these processes in order.

The processor 21 executes, as the product recognition process, product recognition on the photographed image by identification patterns (ACT 33). The processor 21 detects bar codes (identification patterns) included in the photographed image. In the meantime, when the product-by-product region determination process is executed prior to the product recognition process, the processor 21 may detect a bar code with respect to each product image region. The bar code detection method is not limited to a specific method.

Upon extracting the bar code, the processor 21 recognizes the product by each extracted bar code. For example, the processor 21 identifies (recognizes) the product by collating the information (e.g. product code) obtained by a decoding process on each bar code, and the information in the product DB 25. Incidentally, the recognition method of products is not limited to a specific method. For example, the product recognition process may be realized by using a method of identifying products by using an image characteristic amount (identification pattern) such as a density gradient or a color histogram.

When the product in the photographed image was successfully recognized, the processor 21 determines, based on the product information of the product DB 25, the area (reference area) of the surface to which the bar code of the recognized product is added (ACT 34). For example, the processor 21 stores the area (reference area) of the recognized product in the RAM 23 by associating this area (reference area) with the product code. In addition, the processor 21 stores position information, which indicates a position in the photographed image where the bar code of the recognized product was detected, in the RAM 23 by associating this position information with the product code.

Besides, in the product-by-product region determination process, the processor 21 detects the image regions of individual products in the photographed image (ACT 35). For example, the processor 21 detects an individual product region by a labeling process after obtaining a difference between the photographed image and the background image. In the meantime, if the product recognition process is executed in precedence, the processor 21 may try to detect the image region of one product with respect to each detected bar code. The detection method of the image region of each product is not limited to a specific method. If the image region of each product is detected from the photographed image, the processor 21 determines the area of the image region of each detected product (each product region) (ACT 36). For example, the processor 21 may determine the number of pixels in the image region of each detected individual product as the area of each product region.

The processor 21 compares, on a product-by-product basis, the reference area of the recognized product and the area of the region of this product in the photographed image (ACT 37). Specifically, the processor 21 compares the reference area of the product recognized by the bar code, which is registered in the product DB 25, and the area of the image region including the recognized bar code. By this comparison, the processor 21 determines whether the compared areas are substantially equal or not (ACT 38). For example, the processor 21 determines whether the compared areas are substantially equal or not, by determining whether the difference between the area of a certain product region and the reference area of the recognized product is within a predetermined range. This comparison is executed on the image regions of all products.

If the processor 21 determines that the area of each product region in the photographed image and the reference area of the recognized product are substantially equal (ACT 38, YES), the processor 21 determines that there is no unrecognized product. If the processor 21 determines that there is no unrecognized product, the processor 21 executes the settlement process on all recognized products (ACT 39). For example, the processor 21 totals purchase prices of respective products, and executes a settlement process of the totaled purchase price.

In addition, if the processor 21 determines that there is a product with respect to which the area of the product region in the photographed image and the reference area of the recognized product are not substantially equal (ACT 38, NO), the processor 21 determines that there is an unrecognized product. Furthermore, the processor 21 determines that there is an unrecognized product in the image region of the product, the area of which is not substantially equal to the reference area of the recognized product. If the processor 21 determines that there is an unrecognized product, the processor 21 generates an alert notifying the operator of the occurrence of an error (ACT 40). For example, the processor 21 issues, as an alert, a notification on the image region in which the unrecognized product exists. Besides, the processor 21 may generate an alert indicating that an unrecognized product is present or settlement is impossible. In addition, the processor 21 may produce, as an alert, an alarm by a speaker or the like provided on the settlement apparatus 1B.

Incidentally, the processor 21 may execute the product recognition process once again on the image region, which the processor 21 determined to include the unrecognized product, by a product recognition method different from the product recognition method executed in the above ACT 33. If the processor 21 obtains a recognition result by the re-executed product recognition process, which is different from the recognition result of the already executed process of ACT 33, the processor 21 may re-execute the process of ACT 34 onwards.

After generating an alert, the processor 21 accepts an instruction of retry of the settlement process (product recognition process) (ACT 41). For example, the processor 21 retries the settlement process in accordance with an instruction on a retry button. The retry button may be an icon which the display unit 6 displays, or a hard key provided on the operation unit 5. If retry was instructed (ACT 41, YES), the processor 21 returns to ACT 32 and executes the above process once again. If retry is not instructed (ACT 41, NO), the processor 21 stops the settlement process and transitions to a standby state.

As described above, the settlement apparatus 1B according to the second embodiment determines, on a product-by-product basis, whether the area of the image region of the product in the photographed image and the reference area of the recognized product, which is registered in the product DB, are substantially equal. If the reference area of the recognized product and the area of the image region of the product in the photographed image are not substantially equal, the settlement apparatus 1B determines that an unrecognized product exists in the image region of the product.

Specifically, the settlement apparatus 1B can not only detect an unrecognized product from the photographed image, but can also determine a region in which the unrecognized product exists. The settlement apparatus 1B can not only prevent settlement from being executed with prices which are lower than actual prices, but can also issue a notification on the region in which a product that failed to be recognized exists.

Third Embodiment

Next, a settlement apparatus (article recognition apparatus) 1C according to a third embodiment is described.

Figure 11:
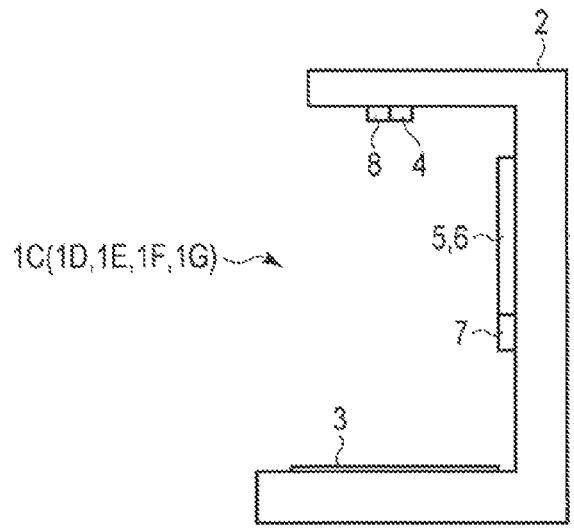
FIG. 11 is a view which schematically illustrates a configuration example of the external appearance of a settlement apparatus according to a third embodiment.

FIG. 11 is a view which schematically illustrates a configuration example of the external appearance of the settlement apparatus 1C according to the third embodiment.

The settlement apparatus 1C includes a housing 2, a product table 3, a camera 4, a display unit 5, an operation unit 6, a settlement unit 7, and a distance sensor 8. The housing 2, product table 3, camera 4, display unit 5, operation unit 6 and settlement unit 7 can be realized by the same components as in the settlement apparatus 1A. Specifically, the settlement apparatus 1C can be realized by a configuration in which the distance sensor 8 is added to the configuration of the settlement apparatus 1A.

The distance sensor 8 is a sensor for capturing a distance image. The distance sensor 8 measures a distance from a position of disposition thereof to an object. In the configuration example illustrated in FIG. 11, the distance sensor 8 is disposed above the product table 3. The distance sensor 8 has a measurement range which corresponds to the photography range of the camera 4 including the entirety of the product table 3. For example, the distance sensor 8 may be a plurality of sensors. The settlement apparatus 1C acquires a distance image, based on a measurement result of a distance in the photography range by the distance sensor 8.

Next, a configuration example of a control system of the settlement apparatus 1C is described.

Figure 12:
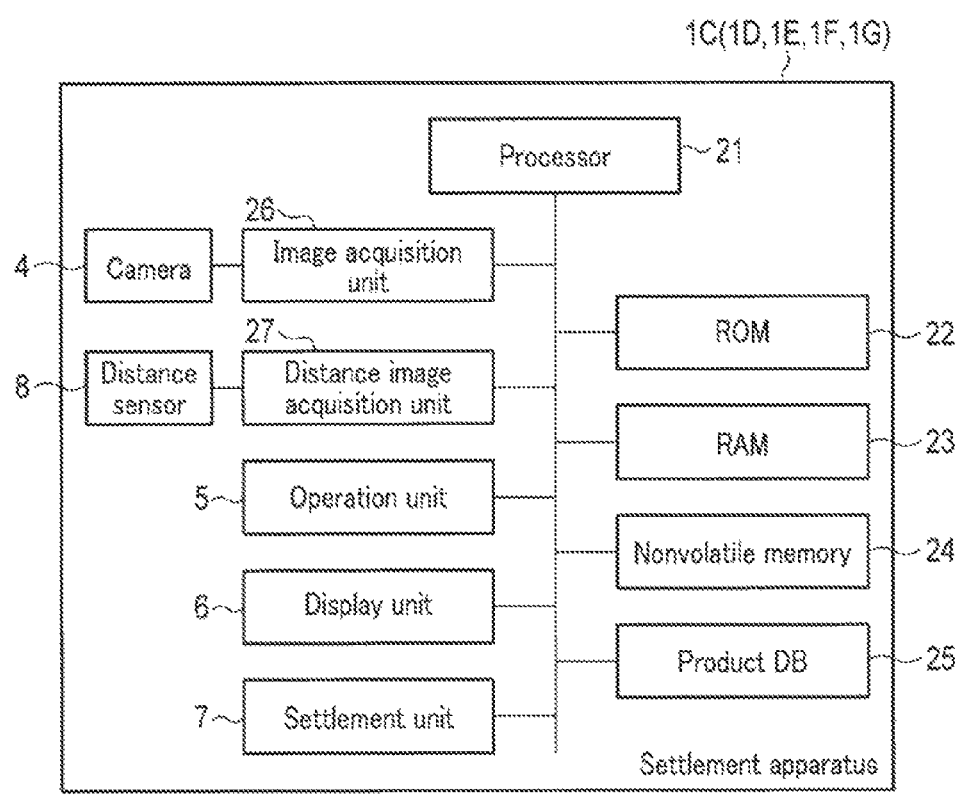
FIG. 12 is a block diagram illustrating a configuration example of a control system of the settlement apparatus according to the third embodiment.

FIG. 12 is a block diagram illustrating a configuration example of the control system of the settlement apparatus 1C.

As illustrated in FIG. 12, the settlement apparatus 1C includes the camera 4, display unit 5, operation unit 6, settlement unit 7, distance sensor 8, a processor 21, a ROM 22, a RAM 23, a nonvolatile memory 24, a product database (DB) 25, an image acquisition unit 26, and a distance image acquisition unit 27.

The camera 4, display unit 5, operation unit 6, settlement unit 7, processor 21, ROM 22, RAM 23, nonvolatile memory 24, product DB 25 and image acquisition unit 26 of the settlement apparatus 1C can be realized by the same hardware as in the settlement apparatus 1A. However, the processor 21 includes a function of realizing a third settlement process as the settlement apparatus 1C, which will be described later. Specifically, the processor 21 executes programs for realizing the third settlement process, which are stored in the nonvolatile memory 24.

In addition, the product DB 25 of the settlement apparatus 1C stores product information for executing the third settlement process. The product DB 25 of the settlement apparatus 1C stores, as the product information of each product, a product code, a product name, a price, a reference height, etc. The reference height is a reference value for article region information. Specifically, when the height of an article in an image region of the article is set to be article region information, the reference height is registered in the product DB 25 as a reference value for article region information. The reference height is a height in a state in which the product is correctly set on the product table 3 (i.e. the product is set without an overlap, with the bar code surface facing upward). Incidentally, the product DB 25 may store product information including a reference area.

The distance image acquisition unit 27 is an interface for connection to the distance sensor 8. The distance image acquisition unit 27 acquires a distance image based on a distance which the distance sensor 8 measures. The distance image is an image indicative of the distribution of distances in the photography range of the camera 4. For example, the distance image may be an image with colors varied in accordance with the distance which the distance sensor 8 measures.

The processor 21 of the settlement apparatus 1C determines the height of a product, based on a distance image which the distance image acquisition unit 27 acquires. The processor 21 determines the height of the product, based on a difference between the distance to the surface (background surface) on which the product that the distance sensor 8 measures is placed, and the distance to the to-be-photographed surface of the product. For example, the processor 21 determines the height of the product, based on a difference between the height up to the product table 3 which the distance sensor 8 measures, and the height up to the surface of the product on the product table 3. In addition, the processor 21 may determine the height of the product, based on a difference between the height up to the bottom surface of the basket on the product table 3 which the distance sensor 8 measures, and the height up to the surface of the product in the basket. Besides, the distance image acquisition unit 27 may execute the determination of the height of the product.

The height up to the product surface as the height of the product may be the height of the entire bar code surface of the product (e.g. an average height of the to-be-photographed surface), or may be the height of the position of the bar code. In addition, the height of the position of the bar code may be the height of a predetermined position of the bar code region (e.g. a position near the center position), or may be an average height of the entire bar code region. When the height of the product is set to be the height of the position of the bar code, the product DB 25 stores the height of the position of the bar code as a reference height.

FIG. 13 is a block diagram illustrating a configuration example of the processing function of the settlement apparatus 1C.

A processing unit 50 shown in FIG. 13 illustrates a processing function which the processor 21 of the settlement apparatus 1C realizes by executing programs stored in the nonvolatile memory 24 or ROM 22. The processing unit 50 includes an individual product region detector 41, an individual-product area determination unit 42, a pattern detector 33, a pattern recognition unit 34, an individual-product height determination unit 51, a matching determination unit 55, and a notification unit 56. The components 41, 42, 33, 34, 51, 55 and 56 in the processing unit 50 are realized by the processor 21 executing programs. However, a part or all of the respective components in the processing unit 50 may be realized by hardware such as different processors.

Incidentally, since the pattern detector 33 and pattern recognition unit 34 can be realized by the same as in FIG. 3, a detailed description thereof is omitted. In addition, since the individual-product region detector 41 and individual-product area determination unit 42 can be realized by the same as in in FIG. 6, a detailed description thereof is omitted.

The individual-product height determination unit 51 determines the height of the product in the image region of the individual product which the individual-product region detector 41 detects. For example, the individual-product height determination unit 51 determines the height of the product (the actually measured product height) in the image region of the product detected from the photographed image, in the distance image based on the measurement value of the distance sensor 8 which the distance image acquisition unit 27 acquires. The individual-product height determination unit 51 determines the height of the product, for example, based on a difference between the distance to the background (e.g. the product table or the bottom of the basket) and the distance to the product of the product region. The method of determining the height of the product, which is applied to the individual-product height determination unit 51, is not limited to a specific method. In addition, the processor 21 may be configured to determine the height of the position at which the bar code in the product region was detected.

The matching determination unit 55 determines, with respect to the recognition result of the product, whether the state of the image region of the product in the photographed image matches with the state of the product in the distance image (the actually measured height of each product). The matching determination unit 55 determines whether the actually measured area and height of each product are substantially equal to the area and height registered in the product DB 25. The matching determination unit 55 determines, with respect to each recognized product, whether the area of the product region detected from the photographed image is substantially equal to the reference area registered in the product DB 25. Furthermore, the matching determination unit 55 determines whether the actually measured height of the product is substantially equal to the reference height registered in the product DB 25. For example, the matching determination unit 55 determines whether the area of each product region is substantially equal to the reference area of each recognized product, which is registered in the product DB 25, by determining whether the difference between the area of each product region and the reference area of each recognized product is within a predetermined range. In addition, the matching determination unit 55 determines whether the reference height of the recognized product, which is registered in the product DB 25, is substantially equal to the actually measured height of the product, by determining whether the difference between the reference height of the recognized product and the actually measured height of the product is within a predetermined range.

The notification unit 56 outputs a determination result by the matching determination unit 55. If the matching determination unit 55 determined that the area and height of each product region are substantially equal to the values registered in the product DB 25, the notification unit 56 outputs a notification that there is no unrecognized product. In addition, if the matching determination unit 55 determined that either the area or the height of each product region is not substantially equal to the value registered in the product DB 25, the notification unit 56 outputs a notification that there is an unrecognized product. For example, the notification unit 56 causes the display unit 6 to display, as an alert, a notification that an unrecognized product exists in the image region of the product with respect to which the matching determination unit 55 determined that either the area or the height is not substantially equal to the value registered in the product DB 25.

Next, a description is given of the relationship between a distance image and a disposition of products.

The distance sensor 8 measures, from above the product table 3, the distance to the product table 3 or to an object on the product table 3. The distance image is an image indicative of a distance which the distance sensor 8 measures in the photography range of the camera 4. Accordingly, when a product is correctly set, the height of the product, which the distance sensor 8 measures, is the height (reference height) which is inherent to the product. When products are set in a stacked state, the distance sensor 8 measures the height of the products in the stacked state.

Figures 14A, 14B:
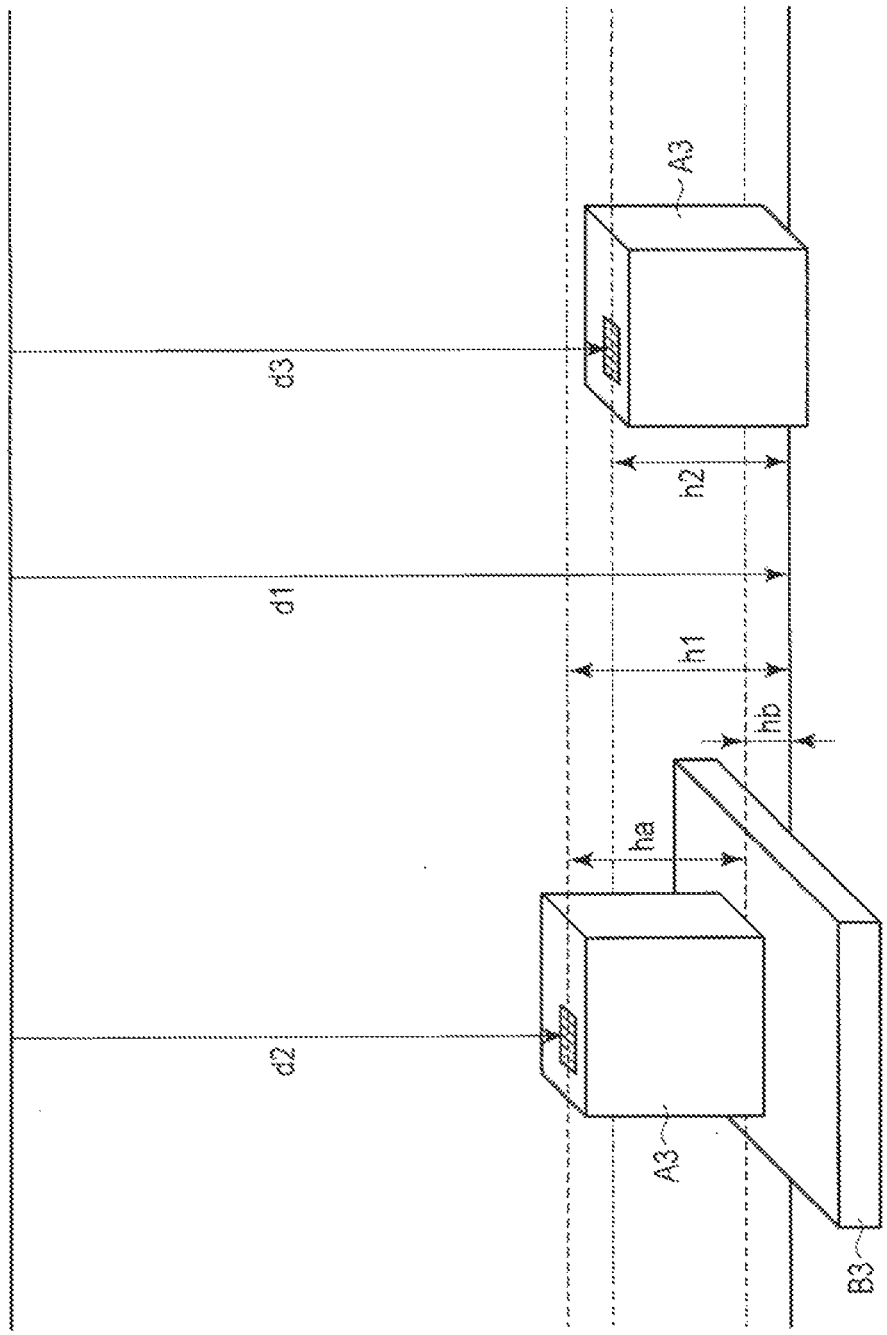
FIG. 14A illustrates a state in which two products that are objects of settlement by the settlement apparatus according to the third embodiment are stacked.
FIG. 14B illustrates a state in which an upper-side product of the two products shown in FIG. 14A is correctly set.

FIG. 14A illustrates an example of disposition in which two products are stacked. FIG. 14B illustrates a state in which an upper-side product of the two products shown in FIG. 14A is correctly set.

In the state of disposition shown in FIG. 14A, a height h1 (d1-d2) of a to-be-photographed surface (bar code surface) of a product A3 is a total value of a height ha of the product A3 and a height hb of the product B3. Specifically, in the state illustrated in FIG. 14A, the height h1 of the bar code surface of the product A3 is higher than the height (reference height) ha of the product A3, which is registered in the product DB 25, by an amount corresponding to the height hb of the product B3. On the other hand, in the state of disposition shown in FIG. 14B, a height h2 (d1-d3) of the bar code surface of the product A3 is substantially equal to the height (reference height) ha of the height (reference height) ha of the product A3, which is registered in the product DB 25.

The processor 21 determines whether the height of the bar code surface of each product is substantially equal to the reference height of the product registered in the product DB 25. If the height of the bar code surface, which is determined by the distance image, is substantially equal to the reference height of the product, the processor 21 determines that there is no overlap of products (there is no unrecognized product). In addition, if the height of the bar code surface, which the distance sensor 8 measures, is not substantially equal to the reference height of the product, the processor 21 determines that there is an overlap of products (there is an unrecognized product).

The above-described settlement apparatus 1C compares the area of the product region in the photographed image and the registered area of the product, and compares the actually measured height of the product and the height of the product, which is registered in the product DB. The settlement apparatus 1C determines (confirms) the presence/absence of an overlap with other products, based on the area and height. By this determination, even when products with low heights are stacked, the settlement apparatus 1C can detect an overlap of products with high precision.

Next, a third settlement process in the settlement apparatus 1C according to the third embodiment is described.

Figure 15:
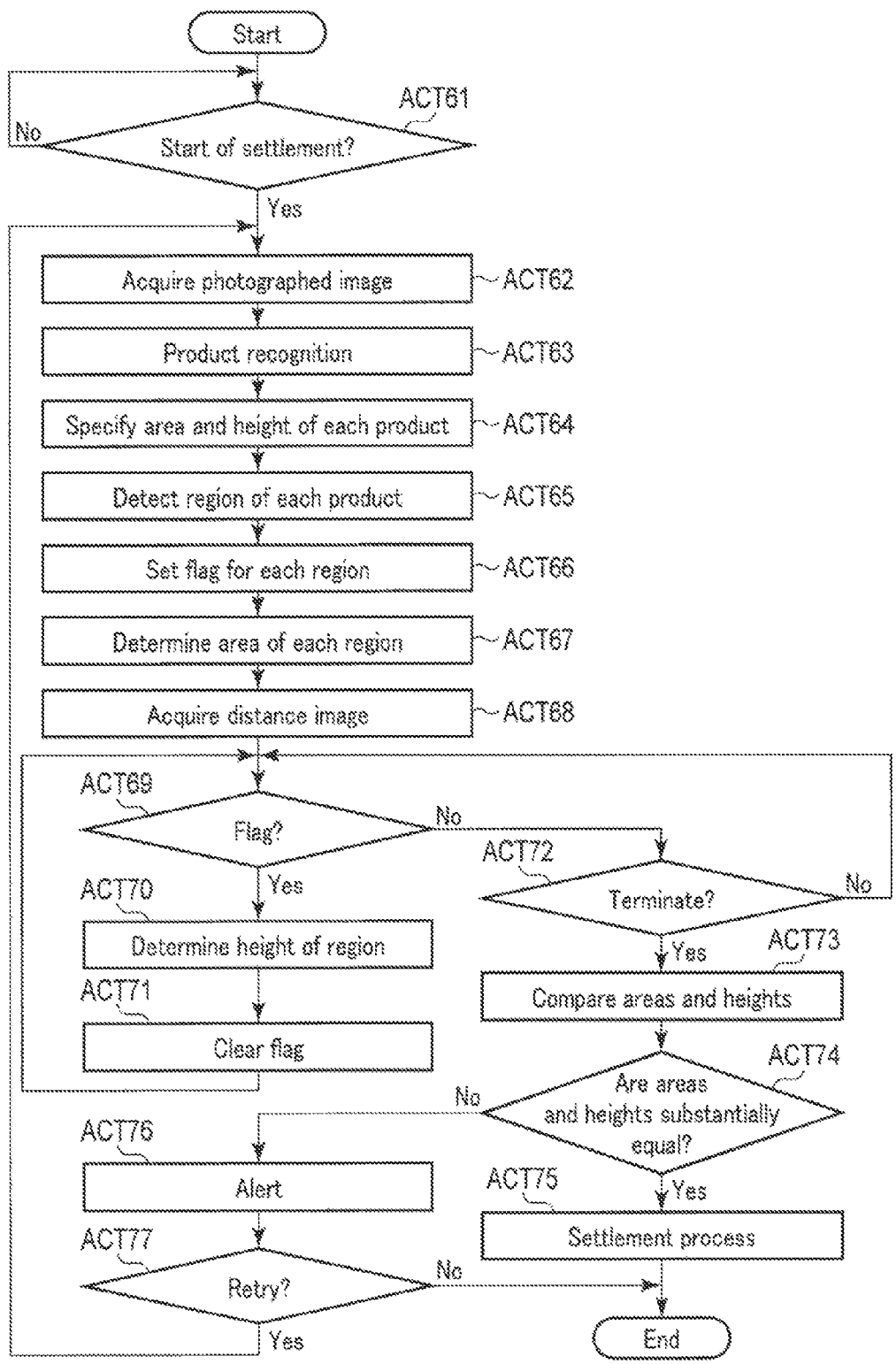
FIG. 15 is a flowchart for describing the flow of a third settlement process in the settlement apparatus according to the third embodiment.

FIG. 15 is a flowchart for describing the flow of the third settlement process in the settlement apparatus 1C according to the third embodiment.

In a standby state, the processor 21 accepts a start instruction of the settlement process (ACT 61). For example, the processor 21 starts the settlement process in accordance with an instruction of the start button. Upon starting the settlement process (ACT 61, YES), the processor 21 instructs the camera 4 to photograph, and instructs the distance sensor 8 to measure a distance.

The camera 4 photographs a photography range including the product table 3 in accordance with the instruction of the processor 21. The camera 4 outputs a photographed image, which the camera 4 captured, to the image acquisition unit 26. The processor 21 acquires, by the image acquisition unit 26, the photographed image which the camera 4 captured (ACT 62). The processor 21 stores the photographed image, which is acquired from the camera 4, in a memory such as the RAM 23.

After acquiring the photographed image, the processor 21 executes a product recognition process for recognizing each product in the photographed image. As the product recognition process, the processor 21 extracts all bar codes (identification patterns) included in the photographed image. The bar code detection method is not limited to a specific method. Upon extracting the bar codes, the processor 21 recognizes each product by each extracted bar code (ACT 63). When the product was successfully recognized by the product recognition process, the processor 21 specifies, based on the product information of the product DB 25, the area (reference area) and height (reference height) of the recognized product (ACT 64). The processor 21 stores the reference area and height of the recognized product in the RAM 23 by associating the reference area and height with the product code. In addition, the processor 21 stores position information, which indicates a position in the photographed image where the bar code of the recognized product was detected, in the RAM 23 by associating this position information with the product code.

Besides, as the product-by-product region determination process, the processor 21 detects the image regions of individual products in the photographed image (ACT 65). For example, the processor 21 detects an individual product region by a labeling process after obtaining a difference between the photographed image and the background image. In the meantime, if the product recognition process is executed in precedence, the processor 21 may try to detect one image region with respect to each detected bar code. The detection method of the image region of each product is not limited to a specific method. Each time the image region is detected from the photographed image, the processor 21 sets a flag corresponding to the detected product region (ACT 66). In addition, if the processor 21 detects the product region from the photographed image, the processor 21 determines the area of the detected product region (ACT 67). The processor 21 executes the process of ACT 66 and ACT 67 with respect to all product regions detected from the photographed image.

The processor 21 stores in the RAM 23 the flag for the detected product region and the area of this product region. In addition, the processor 21 stores in the RAM 23 the position information indicative of the position of the detected product region in the photographed image. Incidentally, the processor 21 may store in the RAM 23 the flag and area of the detected product region by associating the flag and area with the product code of the product recognized by the bar code in the product region.

In addition, the distance sensor 8 measures the distance in the photography range including the product table in accordance with an instruction of the processor 21. The distance sensor 8 outputs a signal indicative of a measurement result of the distance to the distance image acquisition unit 27. The distance image acquisition unit 27 acquires a distance image, based on the signal from the distance sensor 8. The processor 21 acquires, by the distance image acquisition unit 27, the distance image based on the measurement result by the distance sensor 8 (ACT 68). The processor 21 stores the acquired distance image in a memory such as the RAM 23.

In the meantime, after acquiring the distance image, the processor 21 executes a region determination process of determining a region of each product during the process of acquiring the distance image. The processor 21 may execute the product recognition process and the region determination process in parallel, or may execute these processes in order.

Upon acquiring the distance image, the processor 21 determines the presence/absence of a flag corresponding to the product region detected by the product-by-product region determination process (ACT 69). It the processor 21 determines the presence of the flag (ACT 69, YES), the processor 21 determines the height, based on the distance image, with respect to the product region corresponding to the detected flag (ACT 70). For example, the processor 21 determines the height of the product, based on the difference between the distance of the background (e.g. the product table or the bottom of the basket) in the distance image and the distance of the product region. The determination method of the height of the product is not limited to a specific method. In addition, the processor 21 may determine the height of the position where the bar code in the product region was detected.

If the processor 21 determines the absence of the flag corresponding to the product region (ACT 69, NO), the processor 21 determines whether or not to terminate the process of the height determination based on the distance image (ACT 72).

Incidentally, the processor 21 may execute the process of ACT 62 to ACT 67 and the process of ACT 68 to ACT 72 in parallel, or may execute these processes in order, as illustrated in FIG. 13. In the present embodiment, it is assumed that the processor 21 executes the process of ACT 62 to ACT 67 and the process of ACT 68 to ACT 72 in parallel. When the processor 21 executes the process of ACT 62 to ACT 67 and the process of ACT 68 to ACT 72 in parallel, the processor 21 may stand by for the setting of a new flag for a predetermined time in the process of ACT 72. In this case, if no new flag is set within a predetermined time (e.g. 5 seconds) after the processor 21 determined the absence of the flag, the processor 21 terminates the height determination process based on the distance image.

If the processor 21 terminates the height determination process based on the distance image (ACT 72, YES), the processor 21 compares the area and height of each recognized product and the area and height of each product region (ACT 73). The processor 21 compares, with respect to each recognized product, the reference area and the area of the product region calculated from the photographed image, and also compares the reference height and the height of the product determined from the distance image (ACT 73). If the processor 21 successfully confirms that the areas and heights are substantially equal with respect to all recognized products (ACT 74, YES), the processor 21 determines that there is no unrecognized product. If the processor 21 determines that there is no unrecognized product, the processor 21 executes the settlement process on all recognized products (ACT 75). For example, the processor 21 calculates a total purchase price of all recognized products by referring to the product DB 25, and executes a settlement process of the calculated total purchase price.

If the processor 21 determines that either the areas or heights are not substantially equal with respect to at least one product (ACT 74, NO), the processor 21 determines that there is an unrecognized product. Furthermore, the processor 21 determines that there is an unrecognized product in the product region with respect to which the processor 21 determined that the areas or heights are not substantially equal. If the processor 21 determines that there is an unrecognized product, the processor 21 generates an alert notifying the operator of the occurrence of an error (ACT 76). For example, the processor 21 displays, as an alert, information on the display unit, which indicates a region with respect to which the processor 21 determined the presence of an unrecognized product. In addition, the processor 21 may issue, as an alert, a notification indicating there is an overlap of products or settlement is impossible. Besides, the processor 21 may produce, as an alert, an alarm by a speaker or the like provided on the settlement apparatus 1C.

Incidentally, the processor 21 may execute the product recognition process once again on the image region, which the processor 21 determined to include the unrecognized product, by a product recognition method different from the product recognition method executed in the above ACT 63. If the processor 21 obtains a recognition result by the re-executed product recognition process, which is different from the recognition result of the already executed process of ACT 63, the processor 21 may re-execute the process of ACT 64 onwards.

After generating an alert, the processor 21 accepts an instruction of retry of the settlement process (product recognition process) (ACT 77). For example, the processor 21 retries the settlement process in accordance with an instruction on a retry button. The retry button may be an icon which the display unit 6 displays, or a hard key provided on the operation unit 5. If retry was instructed (ACT 77, YES), the processor 21 returns to ACT 62 and executes the above process once again. If retry is not instructed (ACT 77, NO), the processor 21 stops the settlement process and transitions to a standby state.

Incidentally, the above third settlement process is not limited to the procedure illustrated in FIG. 15. For example, the processor 21 may execute the comparison between the reference height of the recognized product and the height based on the distance image after determining (confirming) that the reference area of the recognized product and the area calculated from the photographed image are substantially equal. In addition, processor 21 may execute the comparison between the reference area of the recognized product and the area calculated from the photographed image after determining (confirming) that the reference height of the recognized product and the height based on the distance image are substantially equal.

As described above, the settlement apparatus 1C according to the third embodiment determines (confirms) whether the reference area of the recognized product, which is registered in the product DB, and the area of the product region in the photographed image are substantially equal. Furthermore, the settlement apparatus 1C determines (confirms) whether the reference height of the recognized product, which is registered in the product DB, and the actually measured height of the product in the product region in the photographed image are substantially equal. The settlement apparatus 1C determines that an unrecognized product exists in the image region of the product, with respect to which the reference area and the area of the product region are not substantially equal, or in the image region of the product, with respect to which the reference height and the actually measured height are not substantially equal.

Specifically, the settlement apparatus 1C can determine a region where an unrecognized product exists, not only based on the validity of the area of the product region in the photographed image, but also based on the validity of the actually measured height of the product. Even when the detection of an unrecognized product based on the area of the product region is difficult, the settlement apparatus 1C can determine, with high precision, the presence of an unrecognized product, based on the actually measured height, and robustness is enhanced. For example, the settlement apparatus 1C can detect a plurality of products which are horizontally disposed in contact with each other, based on the validity of the area, and can detect a plurality of stacked products, based on the validity of the height. As a result, the settlement apparatus 1C can surely prevent settlement from being executed with prices which are lower than actual prices.

Fourth Embodiment

Next, a settlement apparatus (article recognition apparatus) 1D according to a fourth embodiment is described.

The settlement apparatus 1D according to the fourth embodiment can be realized by the same hardware configuration as in the settlement apparatus 1C illustrated in FIG. 11 and FIG. 12. However, a fourth settlement process, which the processor 21 of the settlement apparatus 1D executes, is different from the third settlement process.

FIG. 16 is a block diagram illustrating a configuration example of a processing function in the settlement apparatus 1D.

A processing unit 60 shown in FIG. 16 illustrates a processing function which the processor 21 of the settlement apparatus 1D realizes by executing programs stored in the nonvolatile memory 24 or ROM 22. The processing unit 60 includes an individual-product region detector 61, an individual-product height determination unit 62, a pattern detector 33, a pattern recognition unit 34, a matching determination unit 65, and a notification unit 66. The components 61, 62, 33, 34, 65 and 66 in the processing unit 60 are realized by the processor 21 executing programs. However, a part or all of the components in the processing unit 60 may be realized by hardware such as different processors. Incidentally, since the pattern detector 33 and pattern recognition unit 34 can be realized by the same as in FIG. 3, a detailed description thereof is omitted.

The individual-product region detector 61 and individual-product height determination unit 62 function as a product region detection unit which the processor 21 executes. The individual-product region detector 61 detects an image region of an individual product, based on a distance image which the distance image acquisition unit 27 acquires. The individual-product region detector 61 detects, for example, image regions of individual products with respect to individual regions with different distances. The individual-product region detector 61 detects, for example, regions (image regions of individual products) with different distances based on differences in height of individual products, with respect to regions with distances which are different from the distance to the background. The method of detecting image regions on a product-by-product basis, which is applied to the individual-product region detector 61, is not limited to a specific method.

The individual-product height determination unit 62 determines the height of the product in the image region of the individual product which the individual-product region detector 61 detects. For example, the individual-product height determination unit 62 determines the height of the product (the actually measured product height) from the distance image based on the measurement value of the distance sensor 8 which the distance image acquisition unit 27 acquires. The individual-product height determination unit 62 determines the height of the product, for example, based on a difference between the distance to the background (e.g. the product table or the bottom of the basket) and the distance to the product of the product region. The method of determining the height of the product, which is applied to the individual-product height determination unit 62, is not limited to a specific method. In addition, the processor 21 may be configured to determine the height of the position at which the bar code in the product region was detected.

The matching determination unit 65 determines whether the state of the product in the distance image (the actually measured product height) matches with the recognition result of the product. The matching determination unit 65 determines whether the actually measured height of each product is substantially equal to the height registered in the product DB 25. The matching determination unit 65 determines, with respect to each recognized product, whether the actually measured height of the product is substantially equal to the reference height registered in the product DB 25. For example, the matching determination unit 65 determines whether the reference height of the recognized product, which is registered in the product DB 25, is substantially equal to the actually measured height of the product, by determining whether the difference between the reference height of the recognized product and the actually measured height of the product is within a predetermined range.

The notification unit 66 outputs a determination result by the matching determination unit 65. If the matching determination unit 65 determined that the height of each product is substantially equal to the value registered in the product DB 25, the notification unit 66 outputs a notification that there is no unrecognized product. In addition, if the matching determination unit 65 determined that the height of at least one product is not substantially equal to the value registered in the product DB 25, the notification unit 66 outputs a notification that there is an unrecognized product. For example, the notification unit 66 causes the display unit 6 to display, as an alert, a notification that an unrecognized product exists in the image region of the product with respect to which the matching determination unit 65 determined that the height is not substantially equal to the value registered in the product DB 25.

Next, a description is given of a method of identifying regions of individual products in a distance image.

FIG. 17A illustrates an example in which two products with different heights are disposed to neighbor each other. FIG. 17B is a view which schematically illustrates a photographed image which the camera 4 captured by photographing the two products in the disposition state of in FIG. 17A. FIG. 17C is a view which schematically illustrates a distance image based on measurement values of the distance sensor 8 with respect to the products in the disposition state of FIG. 17A.

FIG. 17A illustrates a state in which a product A4 and a product B4 are disposed to neighbor each other. In the disposition state shown in FIG. 17A, the product A4 and product B4 are in contact with each other. Thus, in the photographed image shown in FIG. 17B, it is not easy to distinguish an image region Ra4 of the product A4 and an image region Rb4 of the product B4. In the example shown in FIG. 17A, the product A4 and product B4 are different in height. Thus, in the distance image shown in FIG. 17C, a difference in height (a difference in distance in the distance image) appears between an image region Ra4' of the product A4 and an image region Rb4' of the product B4. Accordingly, in the distance image shown in FIG. 17C, it is possible to clearly distinguish the image region Ra4' of the product A4 and the image region Rb4' of the product B4.

Specifically, the settlement apparatus 1D according to the fourth embodiment identifies the image regions of individual products in the distance image. Thereby, even when a plurality of products are disposed in contact with each other, the settlement apparatus 1D can detect the image regions of individual products, based on a difference in height of the products. The settlement apparatus 1D determines whether the actually measured height of the product in each product region identified from the distance image and the height of the product, which is registered in the product DB, are substantially equal or not. When the settlement apparatus 1D determined that the actually measured height of the product is not substantially equal to the height of the product, which is registered in the product DB, the settlement apparatus 1D can determine that the products overlap.

Next, a fourth settlement process in the settlement apparatus 1D according to the fourth embodiment is described.

Figure 18:
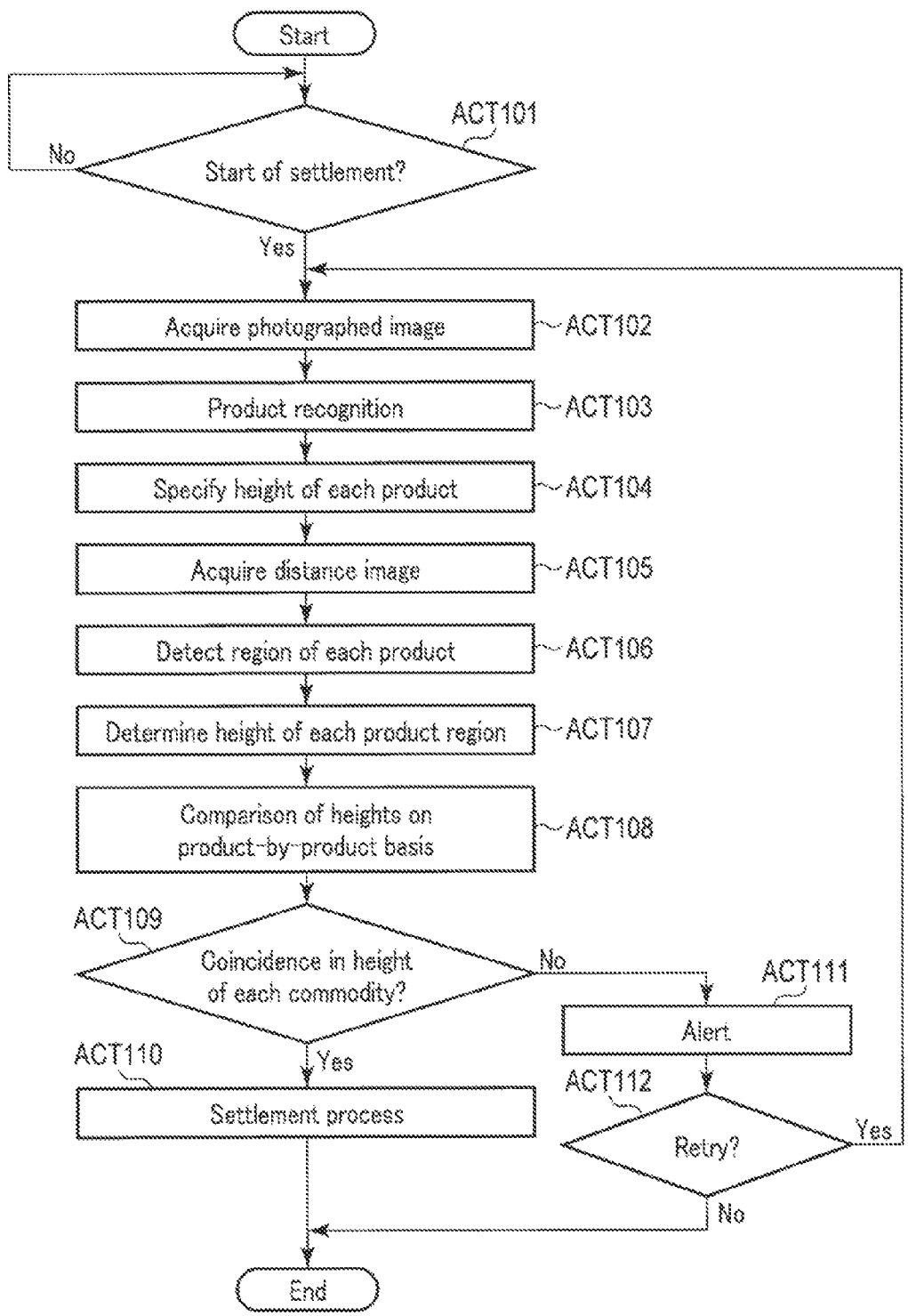
FIG. 18 is a flowchart for describing the flow of a fourth settlement process in the settlement apparatus according to the fourth embodiment.

FIG. 18 is a flowchart for describing an example of the fourth settlement process in the settlement apparatus 1D according to the fourth embodiment.

In a standby state, the processor 21 accepts a start instruction of the settlement process (ACT 101). For example, the processor 21 starts the settlement process in accordance with an instruction of the start button. Upon starting the settlement process (ACT 101, YES), the processor 21 instructs the camera 4 to photograph, and instructs the distance sensor 8 to measure a distance.

The camera 4 photographs a photography range including the product table 3 in accordance with the instruction of the processor 21. The camera 4 outputs a photographed image, which the camera 4 captured, to the image acquisition unit 26. The processor 21 acquires, by the image acquisition unit 26, the photographed image which the camera 4 captured (ACT 102). The processor 21 stores the photographed image, which is acquired from the camera 4, in a memory such as the RAM 23.

After acquiring the photographed image, the processor 21 executes, by the function of the product recognition unit, a product recognition process for recognizing each product in the photographed image. The processor 21 detects all bar codes (identification patterns) included in the photographed image. Upon detecting the bar codes, the processor 21 recognizes each product by each detected bar code (ACT 103). When the product was successfully recognized by the bar code detected from the photographed image, the processor 21 specifies, from the product DB 25, the height (reference height) of the recognized product (ACT 104).

On the other hand, the distance sensor 8 measures the distance in the photography range including the product table in accordance with an instruction of the processor 21. The distance sensor 8 outputs a signal indicative of a measurement result of the distance to the distance image acquisition unit 27. The distance image acquisition unit 27 acquires a distance image, based on the signal from the distance sensor 8. The processor 21 acquires, by the distance image acquisition unit 27, the distance image based on the measurement result by the distance sensor 8 (ACT 105). The processor 21 stores the acquired distance image in a memory such as the RAM 23.

After acquiring the distance image, the processor 21 executes, by the function of the product region detection unit, a process of determining the height of each product in the distance image. The processor detects regions of individual products, based on the distance image (ACT 106). The processor 21 detects the regions of individual products, for example, based on a difference in height of the products in the distance image. Upon detecting the regions of individual products from the distance image, the processor 21 determines the height of the product in each product region in the distance image (ACT 107).

Incidentally, the processor 21 may execute the process of ACT 102 to ACT 104 and the process of ACT 105 to ACT 107 in parallel, or may execute these processes in order. In the present embodiment, it is assumed that the processor 21 executes the process of ACT 102 to ACT 104 and the process of ACT 105 to ACT 107 in parallel.

The processor 21 compares, with respect to each product recognized in the product recognition process, the height (reference height) registered in the product DB 25 and the height of the product (the actually measured height of the product) determined from the distance image (ACT 108). By this comparison, the processor 21 determines whether the actually measured height of the product (product region) is substantially equal to the reference height of each recognized product (ACT 109). For example, the processor 21 determines, with respect to each recognized product, whether the difference between the reference height and the actually measured height is within a predetermined range, thereby determining whether the reference height and the actually measured height are substantially equal or not.

If the processor 21 determines that the reference height and the actually measured height are substantially equal with respect to all products (ACT 109, YES), the processor 21 determines that there is no overlap of products. Upon determining that there is no overlap of products, the processor 21 executes the settlement process on all recognized products (ACT 110). For example, the processor 21 calculates the total amount of purchase prices of all recognized products by referring to the product DB 25, and executes a settlement process of the calculated total amount.

If the processor 21 determines that there is a product with respect to which the reference height and the actually measured height are not substantially equal (ACT 109, NO), the processor 21 determines that there is an overlap of products. Furthermore, the processor 21 determines that there is an overlap of products (a possibility of an overlap of products) in the image region of the product, the actually measured height of which is not substantially equal to the reference height of the product. If the processor 21 determines that there is an overlap of products, the processor 21 generates an alert notifying the operator of the occurrence of an error (ACT 111). For example, the processor 21 displays on the display unit 6, as an alert, a notification indicating that there is an overlap of products or settlement is impossible, or information indicative of a region with respect to which the processor 21 determined the presence of an overlap. In addition, the processor 21 may produce, as an alert, an alarm by a speaker or the like provided on the settlement apparatus 1D.

Incidentally, the processor 21 may execute the product recognition process once again on the image region, which the processor 21 determined to include the unrecognized product, by a product recognition method different from the product recognition method executed in the above ACT 103. If the processor 21 obtains a recognition result by the re-executed product recognition process, which is different from the recognition result of the already executed process of ACT 103, the processor 21 may re-execute the process of ACT 104 onwards.

After generating an alert, the processor 21 accepts an instruction of retry of the settlement process (product recognition process) (ACT 112). For example, the processor 21 retries the settlement process in accordance with an instruction on a retry button. The retry button may be an icon which the display unit 6 displays, or a hard key provided on the operation unit 5. If retry was instructed (ACT 112, YES), the processor 21 returns to ACT 102 and executes the above process once again. If retry is not instructed (ACT 112, NO), the processor 21 stops the settlement process and transitions to a standby state.

As described above, the settlement apparatus 1D according to the fourth embodiment determines (confirms) whether the reference height of each recognized product, which is registered in the product DB, and the actually measured height are substantially equal. The settlement apparatus 1D determines that there is an overlap of products in the product region with respect to which the settlement apparatus 1D determined that the reference height and the actually measured height are not substantially equal. Specifically, the settlement apparatus 1D can determine, with high precision, an overlap of products, based on the height of the product which the distance sensor actually measures. As a result, the settlement apparatus 1D can prevent settlement from being executed in the state in which products overlap, and can prevent settlement from being executed with prices which are lower than actual prices.

Fifth Embodiment

Next, a settlement apparatus (article recognition apparatus) 1E according to a fifth embodiment is described.

The settlement apparatus 1E according to the fifth embodiment can be realized by the same hardware configuration as in the settlement apparatus 1C illustrated in FIG. 11 and FIG. 12. However, a fifth settlement process, which the processor 21 of the settlement apparatus 1E executes, is different from the third settlement process.

Figure 19:
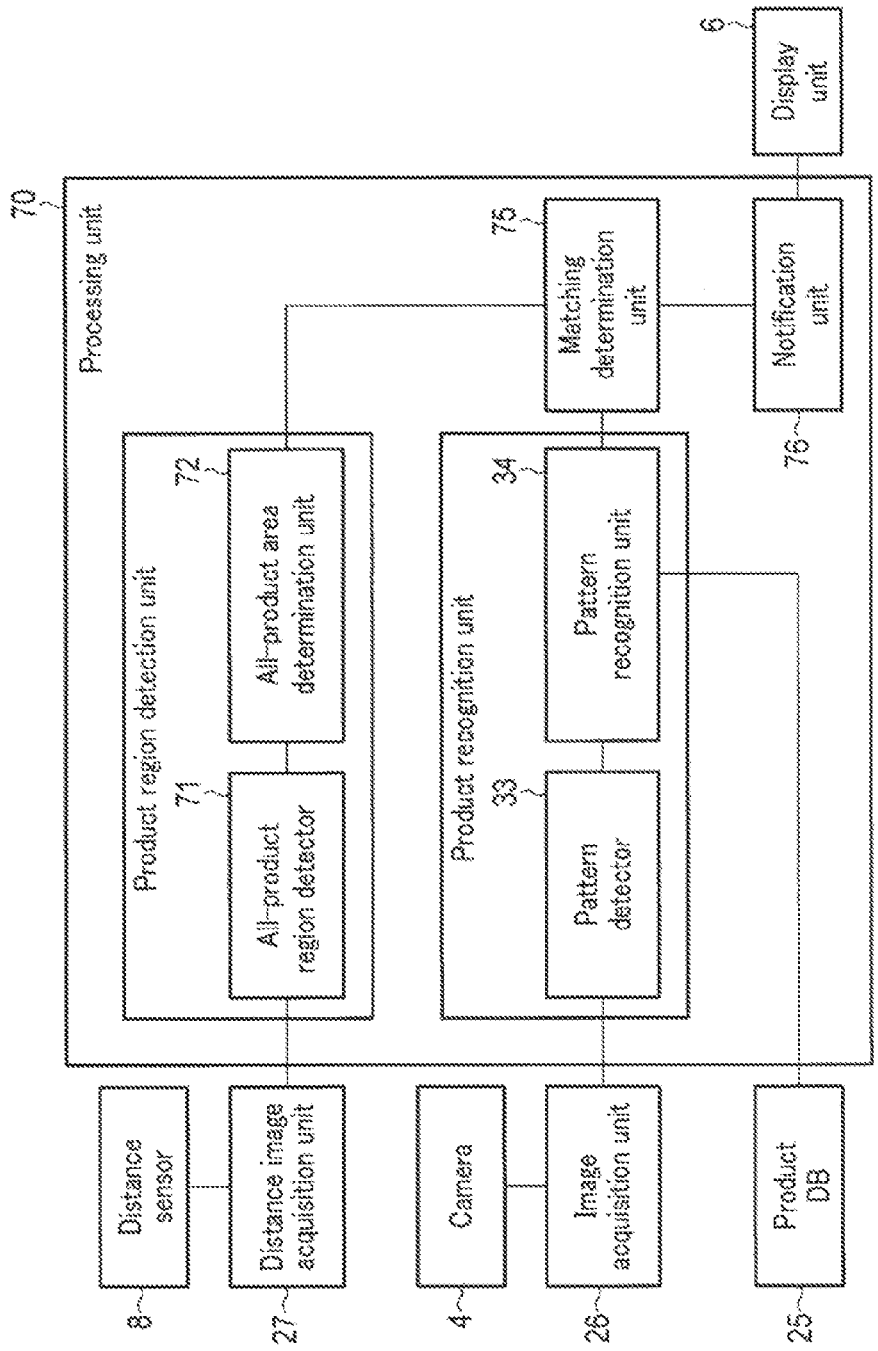
FIG. 19 is a block diagram illustrating a configuration example of a processing function of a settlement apparatus according to a fifth embodiment.

FIG. 19 is a block diagram illustrating a configuration example of a processing function of the settlement apparatus 1E.

A processing unit 70 shown in FIG. 19 illustrates a processing function which the processor 21 of the settlement apparatus 1E realizes by executing programs stored in the nonvolatile memory 24 or ROM 22. The processing unit 70 includes an all-product region detector 71, an all-product area determination unit 72, a pattern detector 33, a pattern recognition unit 34, a matching determination unit 75, and a notification unit 76. The components 71, 72, 33, 34, 75 and 76 in the processing unit 70 are realized by the processor 21 executing programs. However, a part or all of the components in the processing unit 70 may be realized by hardware such as different processors. Incidentally, since the pattern detector 33 and pattern recognition unit 34 can be realized by the same as in FIG. 3, a detailed description thereof is omitted.

The all-product region detector 71 and all-product area determination unit 72 function as a product region detection unit which the processor 21 executes. The all-product region detector 71 detects image regions of all products, based on a distance image which the distance image acquisition unit 27 acquires. The all-product region detector 71 detects, for example, as image regions of all products, regions with different distances to the background. The all-product region detector 71 may detect image regions of all products, based on differences in distance to the background. The method of detecting image regions of respective products, which is applied to the all-product region detector 71, is not limited to a specific method.

The all-product area determination unit 72 determines the area of all product image regions which the all-product region detector 71 detected. The all-product area determination unit 72 calculates the total number of pixels of all detected product image regions as the area of the all product regions. The method of determining the area of all product image regions, which is applied to the all-product area determination unit 72, is not limited to a specific method.

The matching determination unit 75 determines whether the state of the image regions of the products in the distance image matches with the recognition result of the products. The matching determination unit 75 determines whether the area of all product image regions detected from the distance image is substantially equal to the total value of the areas of all recognized products, which are registered in the product DB 25 (the total area of all recognized products). For example, the matching determination unit 75 determines whether the area of all product image regions detected from the distance image is substantially equal to the total area of all recognized products, by determining whether the difference between the area of all product image regions detected from the distance image and the total area of all recognized products is within a predetermined range.

The notification unit 76 outputs a determination result by the matching determination unit 75. If the matching determination unit 75 determined that the area of all product image regions and the total area of all recognized products are substantially equal, the notification unit 76 outputs a notification that there is no unrecognized product. In addition, if the matching determination unit 75 determined that the area of all product image regions and the total area of all recognized products are not substantially equal, the notification unit 76 outputs a notification that there is an unrecognized product. For example, when the matching determination unit 75 determined that the area of all product image regions and the total area of all recognized products are not substantially equal, the notification unit 76 causes the display unit 6 to display, as an alert, a notification that there is an unrecognized product.

Next, a fifth settlement process in the settlement apparatus 1E according to the fifth embodiment is described.

Figure 20:
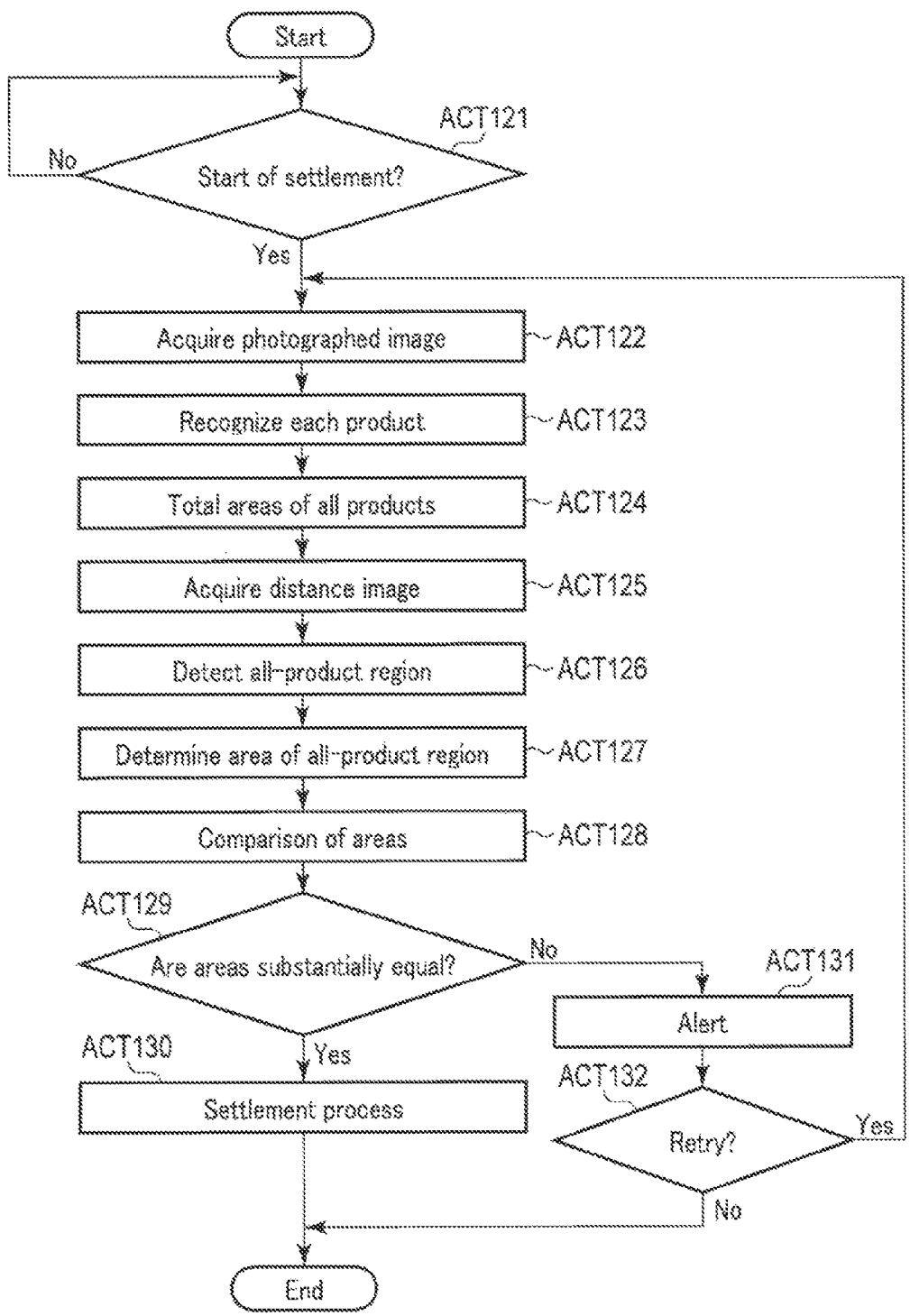
FIG. 20 is a flowchart for describing the flow of a fifth settlement process in the settlement apparatus according to the fifth embodiment.

FIG. 20 is a flowchart for describing an example of the fifth settlement process in the settlement apparatus 1E according to the fifth embodiment.

In a standby state, the processor 21 accepts a start instruction of the settlement process (ACT 121). For example, the processor 21 starts the settlement process in accordance with an instruction of the start button. Upon starting the settlement process (ACT 121, YES), the processor 21 instructs the camera 4 to photograph, and instructs the distance sensor 8 to measure a distance.

The camera 4 photographs a photography range including the product table 3 in accordance with the instruction of the processor 21. The camera 4 outputs a photographed image, which the camera 4 captured, to the image acquisition unit 26. The processor 21 acquires, by the image acquisition unit 26, the photographed image which the camera 4 captured (ACT 122). The processor 21 stores the photographed image, which the processor 21 acquires from the camera 4, in a memory such as the RAM 23.

After acquiring the photographed image, the processor 21 executes, by the function of the product recognition unit, a product recognition process for recognizing each product in the photographed image. The processor 21 detects all bar codes (identification patterns) included in the photographed image. Upon detecting the bar codes, the processor 21 recognizes each product by each detected bar code (ACT 123). When the product was successfully recognized by the bar code detected from the photographed image, the processor 21 acquires, from the product DB 25, the area (reference area) of the bar code surface of each recognized product. If the processor 21 completes the product recognition process, the processor 21 calculates the total area of all recognized products by totaling the reference areas of the recognized products, which the processor 21 acquires from the product DB 25 (ACT 124). For example, the processor 21 stores the calculated total area of all products in the RAM 23.

On the other hand, the distance sensor 8 measures the distance in the photography range including the product table in accordance with an instruction of the processor 21. The distance sensor 8 outputs a signal indicative of a measurement result of the distance to the distance image acquisition unit 27. The distance image acquisition unit 27 acquires a distance image, based on the signal from the distance sensor 8. The processor 21 acquires, by the distance image acquisition unit 27, the distance image based on the measurement result by the distance sensor 8 (ACT 125). The processor 21 stores the acquired distance image in a memory such as the RAM 23.

After acquiring the distance image, the processor 21 executes, by the function of the product region detection unit, a process of detecting image regions of all products in the distance image. The processor 21 detects regions of all products, based on the distance image (ACT 126). The processor 21 detects the image regions of all products, for example, based on a difference in distance to the background in the distance image. Upon detecting the regions of all products from the distance image, the processor 21 determines the area of all product image regions in the distance image (ACT 127).

Incidentally, the processor 21 may execute the process of ACT 122 to ACT 124 and the process of ACT 125 to ACT 127 in parallel, or may execute these processes in order. In the present embodiment, it is assumed that the processor 21 executes the process of ACT 122 to ACT 124 and the process of ACT 125 to ACT 127 in parallel.

If the product recognition process and all-product region detection process terminate, the processor 21 compares the area of all product image regions in the distance image and the total area of all recognized products (ACT 128). By this comparison, the processor 21 determines whether the area of all product image regions in the distance image and the total area of all recognized products are substantially equal or not (ACT 129). For example, the processor 21 determines whether the area of all product image regions in the distance image and the total area of all recognized products are substantially equal or not, by determining whether the difference between the area of all product image regions in the distance image and the total area of all recognized products is within a predetermined range.

If the processor 21 determines that the area of all product image regions in the distance image and the total area of all recognized products are substantially equal (ACT 129, YES), the processor 21 determines that there is no unrecognized product. Upon determining that there is no unrecognized product, the processor 21 executes the settlement process on all recognized products (ACT 130). For example, the processor 21 calculates the total amount of purchase prices of all recognized products by referring to the product DB 25. If the processor 21 calculated the total amount of purchase prices of all recognized products, the processor 21 executes a settlement process of the total amount calculated by the settlement unit 7.

In addition, if the processor 21 determines that the area of all product image regions in the distance image and the total area of all recognized products are not substantially equal (ACT 129, NO), the processor 21 determines that there is an unrecognized product. If the processor 21 determines that there is an unrecognized product, the processor 21 generates an alert notifying the operator of the occurrence of an error (ACT 131). For example, the processor 21 displays on the display unit 6, as an alert, a notification indicating that there is an unrecognized product or settlement is impossible. In addition, the processor 21 may produce, as an alert, an alarm by a speaker or the like provided on the settlement apparatus 1E.

After generating an alert, the processor 21 accepts an instruction of retry of the settlement process (product recognition process) (ACT 132). For example, the processor 21 retries the settlement process in accordance with an instruction on the retry button. If retry was instructed (ACT 132, YES), the processor 21 returns to ACT 122 and executes the above process once again. If retry is not instructed (ACT 132, NO), the processor 21 stops the settlement process and transitions to a standby state.

As described above, the settlement apparatus 1E according to the fifth embodiment determines (confirms) whether the total area of the reference areas of all recognized products and the area of the image regions of all products detected from the distance image are substantially equal or not. If the total area of all recognized products and the area of the image regions of all products detected from the distance image are not substantially equal, the settlement apparatus 1E determines that there is an unrecognized product. The settlement apparatus 1E can determine the area of all product image regions, based on not the photographed image but the distance image. For example, since the distance image can more clearly separate the background and the object (product) than the photographed image, the settlement apparatus 1E can detect image regions of products with high precision. As a result, the settlement apparatus 1E can detect an unrecognized product with high precision, and can prevent settlement from being executed with prices which are lower than actual prices.

Sixth Embodiment

Next, a settlement apparatus (article recognition apparatus) 1F according to a sixth embodiment is described.

The settlement apparatus 1F according to the sixth embodiment can be realized by the same hardware configuration as in the settlement apparatus 1C illustrated in FIG. 11 and FIG. 12. However, a sixth settlement process, which the processor 21 of the settlement apparatus 1F executes, is different from the third settlement process.

Figure 21:
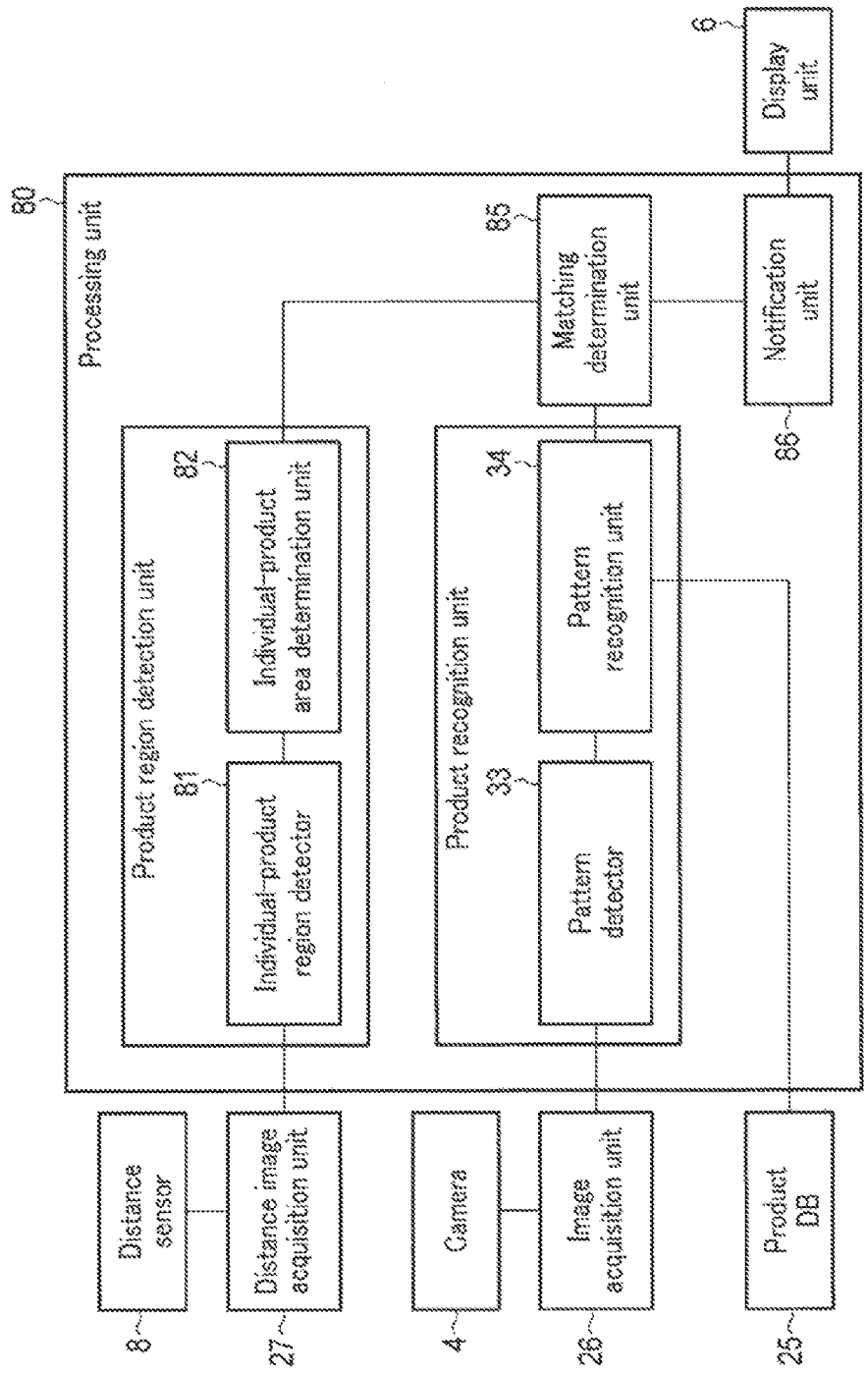
FIG. 21 is a block diagram illustrating a configuration example of a processing function of a settlement apparatus according to a sixth embodiment.

FIG. 21 is a block diagram illustrating a configuration example of a processing function in the settlement apparatus 1F.

A processing unit 80 shown in FIG. 21 illustrates a processing function which the processor 21 of the settlement apparatus 1F realizes by executing programs stored in the nonvolatile memory 24 or ROM 22. The processing unit 80 includes an individual-product region detector 81, an individual-product area determination unit 82, a pattern detector 33, a pattern recognition unit 34, a matching determination unit 85, and a notification unit 86. The components 81, 82, 33, 34, 85 and 86 in the processing unit 80 are realized by the processor 21 executing programs. However, a part or all of the components in the processing unit 80 may be realized by hardware such as different processors. Incidentally, since the pattern detector 33 and pattern recognition unit 34 can be realized by the same as in FIG. 3, a detailed description thereof is omitted.

The individual-product region detector 81 and individual-product area determination unit 82 function as a product region detection unit which the processor 21 executes. The individual-product region detector 81 detects image regions of individual products, based on a distance image which the distance image acquisition unit 27 acquires. The individual-product region detector 81 detects, for example, image regions of individual products, based on a difference in distance to the background and a difference in height of products. The method of detecting image regions of respective products, which is applied to the individual-product region detector 81, is not limited to a specific method.

The individual-product area determination unit 82 determines the area of an image region of an individual product (the area of each product image) which the individual-product region detector 81 detected. The individual-product area determination unit 82 calculates the total number of pixels of the image region of each product in the distance image as the area of each product region. The method of determining the area of each product region, which is applied to the individual-product area determination unit 82, is not limited to a specific method.

The matching determination unit 85 determines whether the state of the product image region in the distance image matches with the recognition result of the product. The matching determination unit 85 determines whether the area of each product region detected from the distance image is substantially equal to the area of each recognized product, which is registered in the product DB 25. For example, the matching determination unit 85 determines whether the area of each product region and the area of each recognized product are substantially equal or not, by determining whether the difference between the area of each product region and the area of each recognized product is within a predetermined range.

The notification unit 86 outputs a determination result by the matching determination unit 85. If the matching determination unit 85 determined that the area of each product region and the area of each recognized product are substantially equal, the notification unit 86 outputs a notification that there is no unrecognized product. In addition, if the matching determination unit 85 determined that the area of each product region and the area of each recognized product are not substantially equal, the notification unit 86 outputs a notification that there is an unrecognized product. For example, the notification unit 86 causes the display unit 6 to display, as an alert, a notification that an unrecognized product exists in the image region of the product, the area of which the matching determination unit 85 determined to be not substantially equal to the area of the recognized product.

Next, a sixth settlement process in the settlement apparatus 1F according to the sixth embodiment is described.

Figure 22:
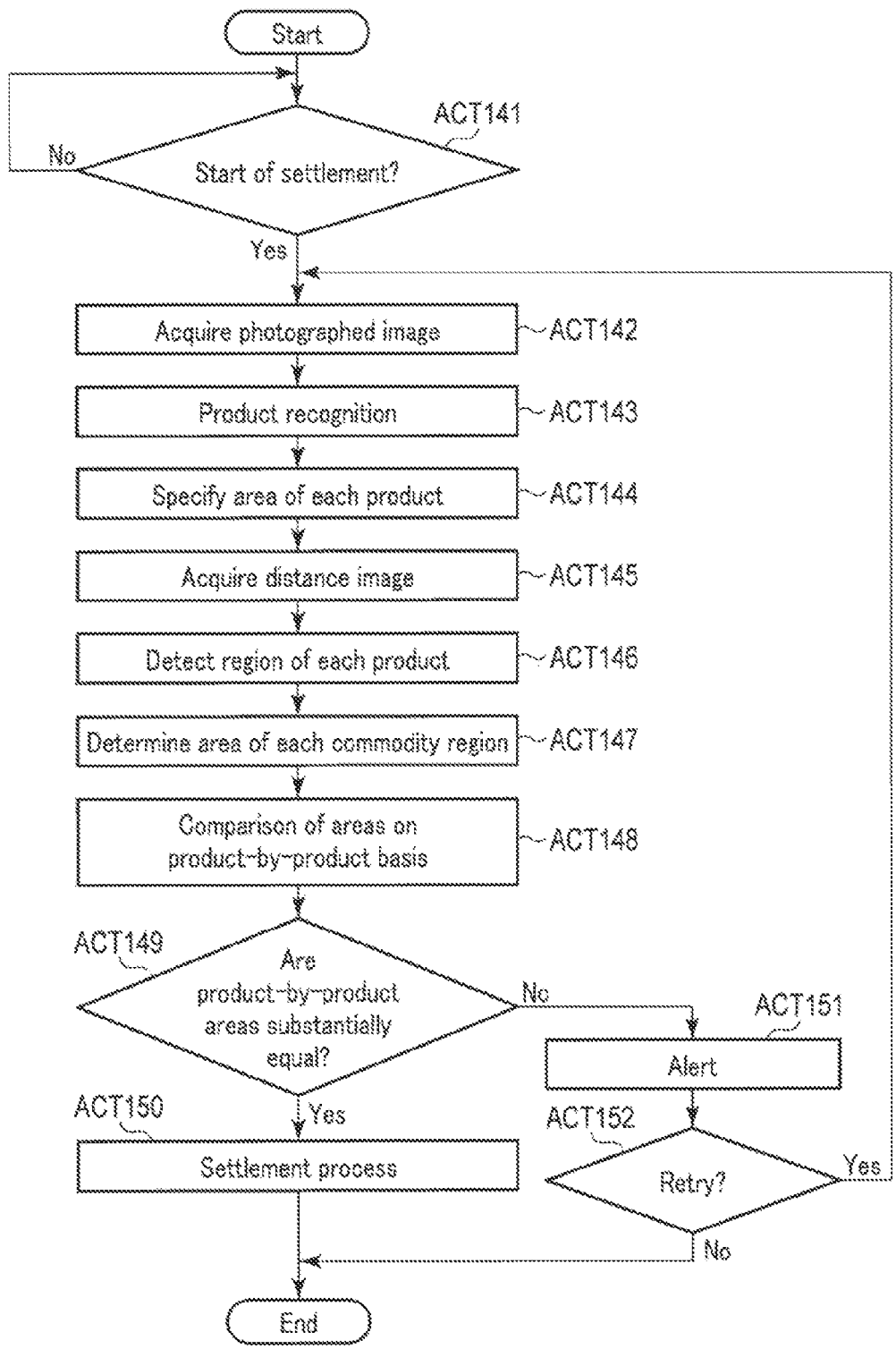
FIG. 22 is a flowchart for describing the flow of a sixth settlement process in the settlement apparatus according to the sixth embodiment.

FIG. 22 is a flowchart for describing an example of the sixth settlement process in the settlement apparatus 1F according to the sixth embodiment.

In a standby state, the processor 21 accepts a start instruction of the settlement process (ACT 141). For example, the processor 21 starts the settlement process in accordance with an instruction of the start button. Upon starting the settlement process (ACT 141, YES), the processor 21 instructs the camera 4 to photograph, and instructs the distance sensor 8 to measure a distance.

The camera 4 photographs a photography range including the product table 3 in accordance with the instruction of the processor 21. The camera 4 outputs a photographed image, which the camera 4 captured, to the image acquisition unit 26. The processor 21 acquires, by the image acquisition unit 26, the photographed image which the camera 4 captured (ACT 142). The processor 21 stores the photographed image, which the processor 21 acquires from the camera 4, in a memory such as the RAM 23.

After acquiring the photographed image, the processor 21 executes, by the function of the product recognition unit, a product recognition process for recognizing each product in the photographed image. The processor 21 detects all bar codes (identification patterns) included in the photographed image. Upon detecting the bar codes, the processor 21 recognizes each product by each detected bar code (ACT 143). When the product was successfully recognized by the bar code detected from the photographed image, the processor 21 specifies, from the product DB 25, the area (reference area) of the bar code surface of each recognized product (ACT 144). If the processor 21 specifies the reference area by the product DB of the recognized product, the processor 21 stores the reference area of each recognized product in the RAM 23.

On the other hand, the distance sensor 8 measures the distance in the photography range including the product table 3 in accordance with an instruction of the processor 21. The distance sensor 8 outputs a signal indicative of a measurement result of the distance to the distance image acquisition unit 27. The distance image acquisition unit 27 acquires a distance image, based on the signal from the distance sensor 8. The processor 21 acquires, by the distance image acquisition unit 27, the distance image based on the measurement result by the distance sensor 8 (ACT 145). The processor 21 stores the acquired distance image in a memory such as the RAM 23.

After acquiring the distance image, the processor 21 executes, by the function of the product region detection unit, a process of detecting the image region of an individual product in the distance image. The processor 21 detects image regions (product regions) of individual products, based on the distance image (ACT 146).

Upon detecting the image regions of the individual products from the distance image, the processor 21 determines the areas of individual product image regions in the distance image (ACT 147). The processor 21 stores the area of each product region, which the processor 21 determined from the distance image, in the RAM 23.

Incidentally, the processor 21 may execute the process of ACT 142 to ACT 144 and the process of ACT 145 to ACT 147 in parallel, or may execute these processes in order. In the present embodiment, it is assumed that the processor 21 executes the process of ACT 142 to ACT 144 and the process of ACT 145 to ACT 147 in parallel.

If the product recognition process and individual-product region detection process terminate, the processor 21 compares the area of each product region in the distance image and the area (reference area) of each recognized product (ACT 148). By this comparison, the processor 21 determines whether the area of each product region in the distance image and the reference area of each recognized product are substantially equal or not (ACT 149). For example, the processor 21 determines whether the area of the image region of each product in the distance image and the reference area of each recognized product are substantially equal or not, by determining whether the difference between the area of the image region of each product in the distance image and the reference area of each recognized product is within a predetermined range.

If the processor 21 determines that the area of each product region in the distance image and the reference area of each recognized product are substantially equal (ACT 149, YES), the processor 21 determines that there is no unrecognized product. Upon determining that there is no unrecognized product, the processor 21 executes the settlement process on all recognized products (ACT 150). For example, the processor 21 calculates the total amount of purchase prices of all recognized products by referring to the product DB 25. If the processor 21 calculated the total amount of purchase prices of all recognized products, the processor 21 executes a settlement process of the total amount calculated by the settlement unit 7.

If the processor 21 determines that the area of each product region in the distance image and the reference area of each recognized product are not substantially equal (ACT 149, NO), the processor 21 determines that there is an unrecognized product. Further, the processor 21 determines that an unrecognized product exists in the image region of the product, the area of which is not substantially equal to the reference area of the recognized product. If the processor 21 determines that there is an unrecognized product, the processor 21 generates an alert notifying the operator of the occurrence of an error (ACT 151). For example, the processor 21 issues, as an alert, a notification on the image region in which the unrecognized product exists. Besides, the processor 21 may generate an alert indicating that an unrecognized product is present or settlement is impossible. In addition, the processor 21 may produce, as an alert, an alarm by a speaker or the like provided on the settlement apparatus 1F.

Incidentally, the processor 21 may execute the product recognition process once again on the image region, which the processor 21 determined to include the unrecognized product, by a product recognition method different from the product recognition method executed in the above ACT 143. If the processor 21 obtains a recognition result by the re-executed product recognition process, which is different from the recognition result of the already executed process of ACT 143, the processor 21 may re-execute the process of ACT 144 onwards.

After generating an alert, the processor 21 accepts an instruction of retry of the settlement process (product recognition process) (ACT 152). For example, the processor 21 retries the settlement process in accordance with an instruction on the retry button. If retry was instructed (ACT 152, YES), the processor 21 returns to ACT 142 and executes the above process once again. If retry is not instructed (ACT 152, NO), the processor 21 stops the settlement process and transitions to a standby state.

As described above, the settlement apparatus 1F according to the sixth embodiment determines (confirms) whether the reference area of each recognized product and the area of the image region of the individual product detected from the distance image are substantially equal or not. The settlement apparatus 1F determines that an unrecognized product exits in the image region of the product, the area of which is not substantially equal to the reference area of the recognized product. The settlement apparatus 1F can highly precisely detect, by the distance image, the image region of the individual product which is difficult to identify by the photographed image, and can identify the image region where the unrecognized product exists. As a result, the settlement apparatus 1F can highly precisely detect the region where an unrecognized product exists, and can prevent settlement from being executed with prices which are lower than actual prices.

Seventh Embodiment

Next, a settlement apparatus (article recognition apparatus) 1G according to a seventh embodiment is described.

The settlement apparatus 1G according to the seventh embodiment can be realized by the same hardware configuration as in the settlement apparatus 1C illustrated in FIG. 11 and FIG. 12. However, a seventh settlement process, which the processor 21 of the settlement apparatus 1G executes, is different from the third settlement process.

FIG. 23 is a block diagram illustrating a configuration example of a processing function in the settlement apparatus 1G.

A processing unit 90 shown in FIG. 23 illustrates a processing function which the processor 21 of the settlement apparatus 1G realizes by executing programs stored in the nonvolatile memory 24 or ROM 22. The processing unit 90 includes an individual-product region detector 81, an individual-product area determination unit 82, a pattern detector 33, a pattern recognition unit 34, an individual-product height determination unit 92, a matching determination unit 95, and a notification unit 96. The components 81, 82, 33, 34, 92, 95 and 96 in the processing unit 90 are realized by the processor 21 executing programs. However, a part or all of the components in the processing unit 90 may be realized by hardware such as different processors.

Incidentally, since the pattern detector 33 and pattern recognition unit 34 can be realized by the same as in FIG. 3, a detailed description thereof is omitted. In addition, since the individual-product region detector 81 and individual-product area determination unit 82 can be realized by the same as in FIG. 21, a detailed description thereof is omitted.

The individual-product height determination unit 92 determines the height of the product in the image region of the individual product which the individual-product region detector 81 detects. The individual-product height determination unit 92 determines the height of the product (the actually measured product height) in the image region of the product detected in the distance image which the distance image acquisition unit 27 acquires. The individual-product height determination unit 92 determines the height of the product, for example, based on a difference between the distance to the background (e.g. the product table or the bottom of the basket) and the distance to the product of the product region. The method of determining the height of the product, which is applied to the individual-product height determination unit 92, is not limited to a specific method. In addition, the processor 21 may be configured to determine the height of the position at which the bar code in the product region was detected.

The matching determination unit 95 determines whether the height of the product in the distance image and the state of the image region of the product match with the recognition result of the product. The matching determination unit 95 determines, with respect to each recognized product, whether the actually measured area and height of each product are substantially equal to the area and height of each recognized product, which are registered in the product DB 25. For example, the matching determination unit 95 determines whether the reference area of each recognized product and the area of each product region are substantially equal or not, by determining whether the difference between the reference area of each recognized and the area of each product region is within a predetermined range. In addition, the matching determination unit 95 determines whether the reference height of each recognized product and the actually measured height of the product are substantially equal or not, by determining whether the difference between the reference height of each recognized product and the actually measured height of the product is within a predetermined range.

The notification unit 96 outputs a determination result by the matching determination unit 95. If the matching determination unit 95 determined that the area and height of each product region are substantially equal to the values registered in the product DB 25, the notification unit 96 outputs a notification that there is no unrecognized product. In addition, if the matching determination unit 95 determined that either the area or the height of each product region is not substantially equal to the value registered in the product DB 25, the notification unit 96 outputs a notification that there is an unrecognized product. For example, the notification unit 96 causes the display unit 6 to display, as an alert, a notification that an unrecognized product exists in the image region of the product with respect to which the matching determination unit 95 determined that either the area or the height is not substantially equal to the value registered in the product DB 25.

Next, a seventh settlement process in the settlement apparatus 1G according to the seventh embodiment is described.

Figure 24:
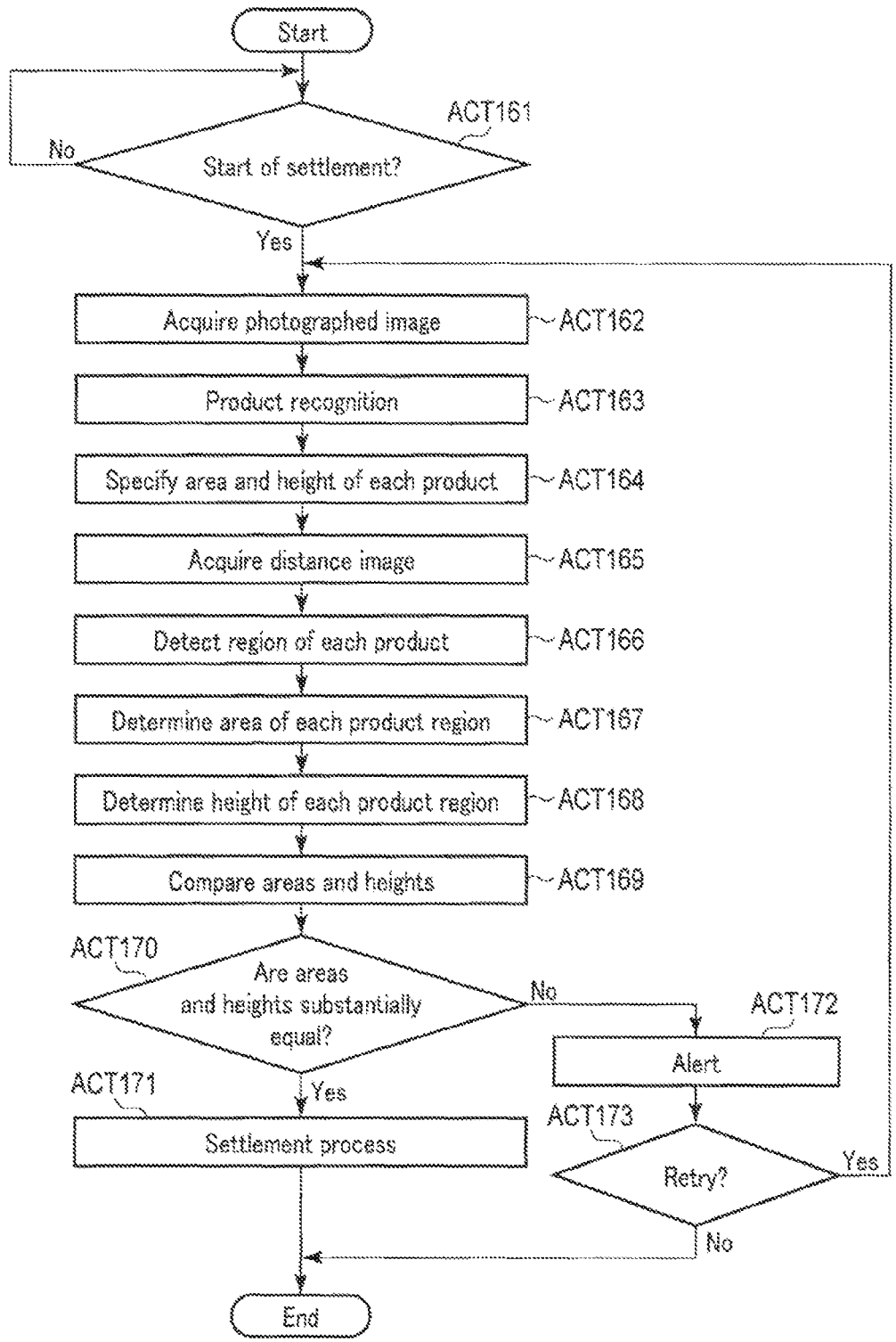
FIG. 24 is a flowchart for describing the flow of a seventh settlement process in the settlement apparatus according to the seventh embodiment.

FIG. 24 is a flowchart for describing an example of the seventh settlement process in the settlement apparatus 1G according to the seventh embodiment.

In a standby state, the processor 21 accepts a start instruction of the settlement process (ACT 161). For example, the processor 21 starts the settlement process in accordance with an instruction of the start button. Upon starting the settlement process (ACT 161, YES), the processor 21 instructs the camera 4 to photograph, and instructs the distance sensor 8 to measure a distance.

The camera 4 photographs a photography range including the product table 3 in accordance with the instruction of the processor 21. The camera 4 outputs a photographed image, which the camera 4 captured, to the image acquisition unit 26. The processor 21 acquires, by the image acquisition unit 26, the photographed image which the camera 4 captured (ACT 162). The processor 21 stores the photographed image, which the processor 21 acquires from the camera 4, in a memory such as the RAM 23.

After acquiring the photographed image, the processor 21 executes, by the function of the product recognition unit, a product recognition process for recognizing each product in the photographed image. The processor 21 detects all bar codes (identification patterns) included in the photographed image. Upon detecting the bar codes, the processor 21 recognizes each product by each detected bar code (ACT 163). When the product was successfully recognized by the bar code detected from the photographed image, the processor 21 specifies, from the product DB 25, the area (reference area) of the bar code surface of each recognized product (ACT 164). The processor 21 stores the reference area of each recognized product in the RAM 23.

On the other hand, the distance sensor 8 measures the distance in the photography range including the product table 3 in accordance with an instruction of the processor 21. The distance sensor 8 outputs a signal indicative of a measurement result of the distance to the distance image acquisition unit 27. The distance image acquisition unit 27 acquires a distance image, based on the signal from the distance sensor 8. The processor 21 acquires, by the distance image acquisition unit 27, the distance image based on the measurement result by the distance sensor 8 (ACT 165). The processor 21 stores the acquired distance image in a memory such as the RAM 23.

After acquiring the distance image, the processor 21 executes, by the function of the product region detection unit, a process of detecting the image region of an individual product in the distance image. The processor 21 detects image regions (product regions) of individual products, based on the distance image (ACT 166). For example, the processor 21 detects image regions of individual products from the distance image, based on a difference in distance to the background in the distance image and a difference in height between products. Upon detecting the image regions of the individual products from the distance image, the processor 21 determines the areas of individual product image regions in the distance image (ACT 167). The processor 21 stores the area of each detected product region in the RAM 23.

Furthermore, upon acquiring the distance image, the processor 21 determines the height of the product (actually measured product height) in the image region of each product detected from the distance image (ACT 168). The processor 21 stores the determined height of the product in each product region in the RAM.

Incidentally, the processor 21 may execute the process of ACT 162 to ACT 164 and the process of ACT 165 to ACT 168 in parallel, or may execute these processes in order. In the present embodiment, it is assumed that the processor 21 executes the process of ACT 162 to ACT 164 and the process of ACT 165 to ACT 168 in parallel.

If the process up to ACT 168 terminates, the processor 21 compares the area of each product region and the actually measured height of the product with the reference area and reference height of each recognized product (ACT 169). By this comparison, the processor 21 determines whether the area of each product region in the distance image and the actually measured height of the product and the reference area and reference height of each recognized product are substantially equal (ACT 170). For example, the processor 21 determines whether the area of each product region and the reference area of each recognized product are substantially equal or not, by determining whether the difference between the area of each product region and the reference area of each recognized product is within a predetermined range. Besides, the processor 21 determines whether the actually measured height of each product and the reference height of each recognized product are substantially equal or not, by determining whether the difference between the actually measured height of each product and the reference height of each recognized product is within a predetermined range.

When the area of each product region and the actually measured height of the product and the reference area and reference height of each recognized product are substantially equal (ACT 170, YES), the processor 21 determines that there is no unrecognized product. Upon determining that there is no unrecognized product, the processor 21 executes the settlement process on all recognized products (ACT 171). For example, the processor 21 calculates the total amount of purchase prices of all recognized products by referring to the product DB 25. If the processor 21 calculated the total amount of purchase prices of all recognized products, the processor 21 executes a settlement process of the total amount calculated by the settlement unit 7.

When there is a product with respect to which either the area of each product region or the actually measured height of the product is not substantially equal to the reference area or reference height of each recognized product (ACT 170, NO), the processor 21 determines that there is an unrecognized product. Further, the processor 21 determines that an unrecognized product exists in the image region of the product, the area or height of which is not substantially equal to the reference area or reference height of the recognized product. If the processor 21 determines that there is an unrecognized product, the processor 21 generates an alert notifying the operator of the occurrence of an error (ACT 172). For example, the processor 21 issues, as an alert, a notification on the image region in which the unrecognized product exists. Besides, the processor 21 may generate an alert indicating that an unrecognized product is present or settlement is impossible. In addition, the processor 21 may produce, as an alert, an alarm by a speaker or the like.

Incidentally, the processor 21 may execute the product recognition process once again on the image region, which the processor 21 determined to include the unrecognized product, by a product recognition method different from the product recognition method executed in the above ACT 163. If the processor 21 obtains a recognition result by the re-executed product recognition process, which is different from the recognition result of the already executed process of ACT 163, the processor 21 may re-execute the process of ACT 164 onwards.

After generating an alert, the processor 21 accepts an instruction of retry of the settlement process (product recognition process) (ACT 173). For example, the processor 21 retries the settlement process in accordance with an instruction on the retry button. If retry was instructed (ACT 173, YES), the processor 21 returns to ACT 162 and executes the above process once again. If retry is not instructed (ACT 173, NO), the processor 21 stops the settlement process and transitions to a standby state.

As described above, the settlement apparatus 1G according to the seventh embodiment determines (confirms) whether the reference area of each recognized product and the area of each product region detected from the distance image are substantially equal or not. Besides, the settlement apparatus 1G determines (confirms) whether the reference height of each recognized product and the actually measured height of the product in the product region detected from the distance image are substantially equal or not. The settlement apparatus 1G determines that an unrecognized product exits in the image region of the product, the area of the product region of which is not substantially equal to the reference area, or in the image region of the product, the actually measured height of which is not substantially equal to the reference height.

Specifically, the settlement apparatus 1G can determine a region where an unrecognized product exists, not only based on the validity of the area of the product region detected from the distance image, but also based on the validity of the actually measured height of the product which is based on the distance image. Even when the detection of an unrecognized product based on the area of the product region is difficult, the settlement apparatus 1G can determine, with high precision, the presence of an unrecognized product, based on the actually measured height, and robustness is enhanced. For example, the settlement apparatus 1G can detect a plurality of products which are horizontally disposed in contact with each other, based on the validity of the area, and can detect a plurality of stacked products, based on the validity of the height. As a result, the settlement apparatus 1G can surely prevent settlement from being executed with prices which are lower than actual prices.

In each of the above-described embodiments, the case was described in which the programs that the processor executes are prestored in the memory in the apparatus. However, the programs which the processor executes can be downloaded in the apparatus through a network, or can be installed in the apparatus from a computer-readable storage medium. The form of the computer-readable storage medium can be any form, such as a CD-ROM, as long as the computer-readable storage medium can store programs and is readable by the apparatus. In addition, the functions obtained by installation or download in advance can be realized in cooperation with an OS (Operating System) or the like in the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An article recognition apparatus comprising:
    an interface configured to acquire a photographic image of a table on which a plurality of articles to be recognized is disposed;
    a database that stores a reference value for each article to be recognized in the plurality of articles; and
    a processor configured to detect identification patterns in the photographic image, to recognize each article in the plurality of articles corresponding to one of the detected identification patterns,
    to detect image regions occupied by the plurality of articles in the photographic image, to determine article region information from the detected image regions, and
    to determine that an unrecognized article is in the plurality articles disposed on the table if the reference values for each article recognized by detection of identification patterns does not match the article region information.

2. The apparatus of claim 1, wherein the database stores a reference area for the image region of the article as the reference value, and the processor is configured to detect the image regions of all articles in the photographic image, to determine an area of the detected image regions of all articles, and to determine that an unrecognized article exists if a total area of the reference areas of each recognized article in the photographic image does not match the area of the detected image regions of all articles in the photographic image.

3. The apparatus of claim 1, wherein the storage unit database stores a reference area for the image region of the article as the reference value, and the processor is configured to detect the image region of each individual article recognized in the photographic image, to determine an area of the detected image region of each recognized individual article, and to determine that an unrecognized article exists in the detected image region of the recognized article, if the area of the detected image region of the recognized article does not match the reference area of the recognized article.

4. The apparatus of claim 3, further comprising a sensor configured to measure a height of an article in the plurality of articles on the table, wherein the database stores a reference height for each article in the plurality of articles, and the processor is configured to determine that an unrecognized article is in the plurality of articles if the height of a recognized article in the plurality of articles that the sensor measures does not match the reference height of the recognized article.

5. An article recognition apparatus comprising:

a first interface image acquisition unit configured to acquire a photographic image of a table on which a plurality of articles to be recognized is disposed;

a database that stores a reference value for each article to be recognized in the plurality of articles;

a processor configured to detect identification patterns in the photographic image, to recognize each article in the plurality of articles corresponding to the detected identification patterns, to detect image regions occupied by the plurality of articles in the photographic image, to determine article region information from the detected image regions, and to determine that an unrecognized article, is in the plurality of articles disposed on the table if the reference values for each article recognized by detection of the identification patterns do not match the article region information; and a second interface through which a distance image depicting distances to the plurality of articles disposed on the table is acquired.

6. The apparatus of claim 5, wherein the database stores a reference height for each article in the plurality of articles, the processor is configured to detect the image region for each of the individual articles from the distance image, to determine an article height in the detected image regions, and to determine that an unrecognized article is in the plurality of articles if the article height in the detected image region does not match the reference height of the recognized article.

7. The apparatus of claim 5, wherein the database stores a reference area for the image region of the article as the reference value, and the processor is configured to detect the image regions of all articles from the distance image, to determine an area of the detected image regions of all articles, and to determine that an unrecognized article is in the plurality of articles, if a total area of the reference areas of each recognized article does not match the area of the detected image regions of all articles.

8. The apparatus of claim 5, wherein the database is configured to store a reference area for the image region of each article as the reference value, the processor is configured to detect the image region of each of the individual articles from the distance image, to determine an area of the detected image region of each individual article, and to determine that an unrecognized article exists in the detected image regions, if the area of the detected image region of each individual article does not match with the reference area of the recognized article.

9. The apparatus of claim 8, further comprising a sensor configured to measure a height of an article in the plurality of articles on the table, wherein the database stores a reference height for each article in the plurality of articles, and the processor is configured to determine that an unrecognized article exists in the image region of a recognized article, if an area of the detected image region of the recognized article does not match the reference area of the recognized article or if a height of the recognized article as measured by the sensor does not match the reference height of the recognized article.

10. An image processing method comprising:

acquiring a photographic image including a plurality of articles disposed on a table;

detecting an identification pattern in the photographic image corresponding to an article in the plurality of articles, and recognizing the article by the detected identification pattern;

detecting image regions occupied by the plurality of articles in the photographic image, and determining article region information for the detected image regions; and determining that an unrecognized article exists if a reference value for the recognized articles in the plurality of articles does not match the article region information determined for the detected image regions.

* * * * *